United States Patent
Baxter, III

(10) Patent No.: US 6,865,643 B2
(45) Date of Patent: Mar. 8, 2005

(54) COMMUNICATIONS ARCHITECTURE FOR A HIGH THROUGHPUT STORAGE PROCESSOR PROVIDING USER DATA PRIORITY ON SHARED CHANNELS

(75) Inventor: William Frederick Baxter, III, Holliston, MA (US)

(73) Assignee: EMC Corporation, Hopkinton, MA (US)

(*) Notice: Subject to any disclaimer, the term of this patent is extended or adjusted under 35 U.S.C. 154(b) by 144 days.

(21) Appl. No.: 10/112,089

(22) Filed: Mar. 29, 2002

(65) Prior Publication Data

US 2003/0188098 A1 Oct. 2, 2003

(51) Int. Cl.[7] .............................................. G06F 12/00
(52) U.S. Cl. ...................... 711/114; 711/100; 711/111; 711/112; 711/161; 711/162; 714/5; 714/6; 714/7
(58) Field of Search .................. 711/114, 161–162, 711/100, 111, 112, 113, 118, 156; 714/5–7; 370/400; 710/260, 10, 22, 35, 6, 204

(56) References Cited

U.S. PATENT DOCUMENTS

| | | | |
|---|---|---|---|
| 5,627,990 A | * | 5/1997 | Cord et al. .................. 711/122 |
| 5,745,771 A | * | 4/1998 | Ohyama et al. ............. 710/262 |
| 5,970,229 A | | 10/1999 | Thomas et al. ......... 395/200.42 |
| 6,092,123 A | * | 7/2000 | Steffan et al. .................. 710/8 |
| 6,289,398 B1 | * | 9/2001 | Stallmo et al. ................. 710/5 |
| 6,298,397 B1 | | 10/2001 | Maruyama .................... 710/25 |
| 6,467,023 B1 | * | 10/2002 | DeKoning et al. .......... 711/114 |
| 2002/0078287 A1 | | 6/2002 | Shinagawa et al. ......... 710/268 |
| 2002/0102046 A1 | | 8/2002 | Newberg et al. .............. 385/17 |
| 2003/0088626 A1 | | 5/2003 | Gupta et al. ................ 709/206 |
| 2003/0167366 A1 | | 9/2003 | Radhakrishna .............. 710/262 |
| 2003/0188099 A1 | * | 10/2003 | Baxter, III .................. 711/114 |
| 2003/0188100 A1 | * | 10/2003 | Solomon et al. ........... 711/114 |
| 2003/0210686 A1 | * | 11/2003 | Terrell et al. ............... 370/389 |

\* cited by examiner

*Primary Examiner*—Matthew Anderson
*Assistant Examiner*—Zhuo H. Li
(74) *Attorney, Agent, or Firm*—David E. Huang, Esq.

(57) ABSTRACT

A storage processor particularly suited to RAID systems provides high throughput for applications such as streaming video data. An embodiment is configured as an ASIC with a high degree of parallelism in its interconnections. Buffering may be used to maintain clear paths for priority data, such as user data being read or written, on shared channels.

6 Claims, 17 Drawing Sheets

COMMUNICATIONS ARCHITECTURE FOR A HIGH THROUGHPUT STORAGE PROCESSOR PROVIDING USER DATA PRIORITY ON SHARED CHANNELS

BACKGROUND

Computer systems and networks require increasing quantities of storage capacity. The need for large amounts of storage together with concerns about reliability, availability of data, and other issues have led to the development of centralized file servers that store files for a number of users. File servers are usually managed by a single entity for many users providing at least the obvious economies for IT managers. In file servers, many of the benefits that accrue in terms of reliability and availability arise because many individual hard disks are used in concert. File servers that seek to maximize these advantages through a variety of mechanisms fall under the umbrella term "Redundant Array of Independent Disks" or "RAID." The operations of individual drives in a RAID array may be coordinated to provide fast reliable service to many users with a minimum of burden on the systems supported by it, such as networks or individual hosts attached to it.

In a typical RAID configuration, data is divided among the drives at the bit, byte or multiple-byte block level. This leads to the possibility of reading and writing data to multiple drives in parallel for even individual file requests. Because the speed of disk drives is usually the bottleneck in file server systems, not the memory or bus speeds, such parallel access can lead to manifold increase in throughput. In fact, throughput enhancement due to this parallel access capability is a commonly-enjoyed benefit of RAID storage systems.

The general technique used to divide data among multiple drives is called data "striping." The reason for the term "striping" is that a single stream is written in uniformly-sized blocks in a regular sequence that can be depicted diagrammatically is painting a stripe across an array of disks. Generally, in these systems, reliability advantages are obtained by adding redundancy to the stored data so that if a disk drive goes bad, the stored data can still be retrieved intact from the data written to other disks. Many types of self-correction systems are known in which even a small amount of additional data can be used to reconstruct a corrupted data sequence. A simple way of doing this is called mirroring where the same data is duplicated on more than one disk. A more sophisticated technique (and one that is highly prevalent) is to generate a relatively small quantity of parity data, which can be used to reconstruct a bad data stream. Often mirroring and striping are used in concert so that each "drive" is actually a small mirrored array consisting of more than one drive containing copies of the same data.

Significant processor capacity is required in RAID systems. The generation of the redundant data used for regenerating good data when a drive goes bad is computationally intensive. Whenever new data is written to a RAID array, parity data must be generated for each block of data. Parity computation uses a logical operation called "exclusive OR" or "XOR". The "OR" logical operator is "true" (1) if either of its operands is true, and false (0) if neither is true. The exclusive OR operator is "true" if and only if one of its operands is true. It differs from "OR" in that if both operands are true, "XOR" is false. The reasons this operation is used is that it is pretty easy to design a processor that can do a lot of XORs very fast. Also, when data is XORed twice, it is undoes the first XOR operation. XOR A with B and then XOR the result with B and the result is A. In RAID, parity data is generated from the data to be stored by XORing each data block with the next data block in a succession, say, of four data blocks. Then if the four blocks are written to four consecutive disks and the result of the four XOR operations written to a fifth (redundant) disk, when one of the four drives goes bad, XORing the remaining good blocks of the four and the fifth will generate the bad block. The operation works for any size blocks. When data is read from the array, XOR calculations may or may not be performed depending on the design of the system.

There can be a big difference between read and write performance. Random reads may only require parts of a stripe from one or two disks to be processed in parallel with other random reads that only need parts of stripes on different disks. But for random writes, every time data on any block in a stripe, is changed, the parity for that stripe has to be calculated anew. This requires the writes not only for the particular blocks to be written, but also reads of all the other pieces of the stripe plus the writing of the new parity block.

The generation of all the parity data takes a substantial quantity of processing capacity in both the read and write directions. Also, the reconstruction of data read from a bad disk takes a great deal of computation. When a disk goes bad, the hardware has to be fixed, but this is preferably done without halting access to data and the system goes into what is called "degraded mode" or "degraded state," continuing to operate, but without all of its disks. Modern RAID systems are designed so that bad data retrieved from a corrupted array is recognized and corrected and delivered to users in such a degraded mode. But this degraded mode is normally significantly limited in some ways that may or may not be apparent to a given user. Users requiring high throughput rates, particularly, may notice a significant loss in performance. For example, users requesting large files, for example streaming audio or video, may find degraded mode provides significantly slower performance. The construction of parity data and the processes of error checking and data reconstruction are not the only computational burdens for a RAID array. Modern disk array architectures also perform operations such as request sorting, prioritizing, combining and redundancy management, among others.

The computer hardware behind RAID systems are usually fairly specialized systems, designed to maximize the performance of a very narrow range of processes, such as queuing, error detection, error correction, and high speed data transfer including caching. Because these requirements are fairly specialized, the hardware designed to support high performance RAID systems has generally been rather specialized. Typically these design requirements are based on performance benchmarks involving many simultaneous accesses to small file units. For example, performance might be indicated by input-output operations per second based on an average 2-kilobyte file size. This type of benchmark places more emphasis on latency and less on throughput and, as a result, typically RAID systems are designed to emphasize these. However, as mentioned above, streaming data places very different demands on a storage system and these are particularly difficult to meet when the system is operating in degraded mode. Systems designed to perform well in terms of the traditional benchmarks tend to do rather poorly in such situations. Thus, there is a need for storage system designs that are capable of providing high minimum performance guarantees for throughput under degraded mode operation.

SUMMARY OF THE INVENTION

A storage processor for a block storage RAID array services disk storage block requests from one or more hosts. At its heart, a application specific integrated chip (ASIC) supports a store and forward data transfer regime in that host to disk transfers are made by placing data in storage processor memory under control of the storage processor, operated on by the ASIC, and sent to the disk array. Disk to host transfers are made by placing the same data store, checked or regenerated by the ASIC, and sent to the requesting host. The main data highway in this model is a host-memory-disk path and memory bandwidth is therefore critical. A single memory space is addressed, in the preferred embodiment, by multiple buses under software management to even the load and provide bandwidth approaching a multiple of that of a single bus.

The problem of achieving high throughput, even under degraded mode conditions, is addressed by providing parallel execution of certain operations that are identified, in the context of the chosen architecture, to be critical to a minimum throughput guarantee. To clear a path for parallel execution, coherence issues that would normally arise with caching are avoided by relying on a cacheless configuration. Point-to-point communications are defined using switches and a number of FIFOs in key ways that allow the sharing of channels between the various devices transferring addressing and user data. By avoiding the use of caches altogether, data traffic to support coherency (e.g. broadcasting of invalidates and such) is eliminated. In addition, the control processor or processors need never operate on the data transferred between the host and disks, allowing parity calculation and data transfers to be handled with a minimum burden on the control processor.

The control processor is further unburdened by providing parallel execution of data transfers and parity calculations with prioritization and programming being prompted by via interrupts. Efficient handling of ordering is, preferably, provided by hardware logic-based masking of interrupts and by other mechanisms described further below.

The invention or inventions will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention or inventions only, and are presented in the cause of providing what is believed to be the most useful and readily understood description of the principles and conceptual aspects of the invention or inventions. In this regard, no attempt is made to show structural details of the invention in more detail than is necessary for a fundamental understanding of the invention or inventions, the description taken with the drawings making apparent to those skilled in the art how the several forms of the invention or inventions may be embodied in practice.

BRIEF DESCRIPTION OF THE DESCRIPTION

DETAILED DESCRIPTION OF THE INVENTION

Figure 1A:
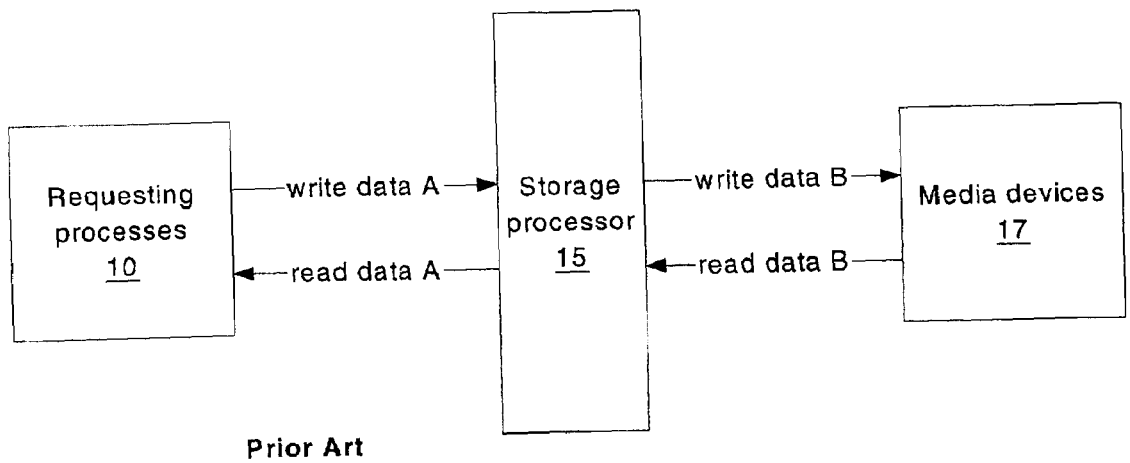
FIG. 1A is a figurative representation of a storage processor according to the prior art.

Referring now to FIG. 1A, a storage processor 15 provides various processes to support the access, by one or more requesting processes 10 to data storage in the form of some kind of media devices 17. In an embodiment, the requesting processes are one or more host computers or network nodes and the media devices includes multiple disks in a redundant array (of independent disks; RAID). The requesting processes store and retrieve data, at least some of which may be stored on the media devices 17. The supporting processes provided by storage processor 15 may include data security, data compression, error detection, error correction, address translation (from a type employed by the requesting process to a type employed by the media devices), and processes that increase the speed of access for reading and writing from/to the media devices 17.

The requesting processes 10 may include ones operating on a single computer or many. The communication between the storage processor 15 and the requesting processes 10 may take any form used for data communications including any protocol or physical media devices such as used for networking, satellite communications, intradevice backplane communications such as buses, or any other. The same as true of the communications interface between the storage processor 15 and media devices 17. The storage processor 15 may provide for translation of protocols to/from one or more employed by the requesting process(es) and to/from one or more employed by the media devices 17.

Figure 1B:
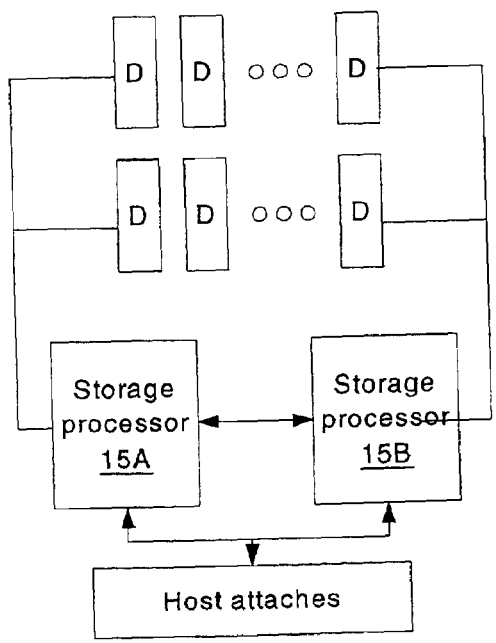
FIG. 1B is a figurative representation of an environment in which the storage processor of various embodiments of the invention may be used.

Although not depicted explicitly in FIG. 1A, the storage processor 15 may include one or more similar devices interconnected by communications channels to provide redundancy as illustrated in FIG. 1B. The same is true of the media devices 17, which may include, for example, mirrored disks or arrays of disks with identical data such that if one needs to be replaced, its role can be played by its mirror drive.

Figure 2A:
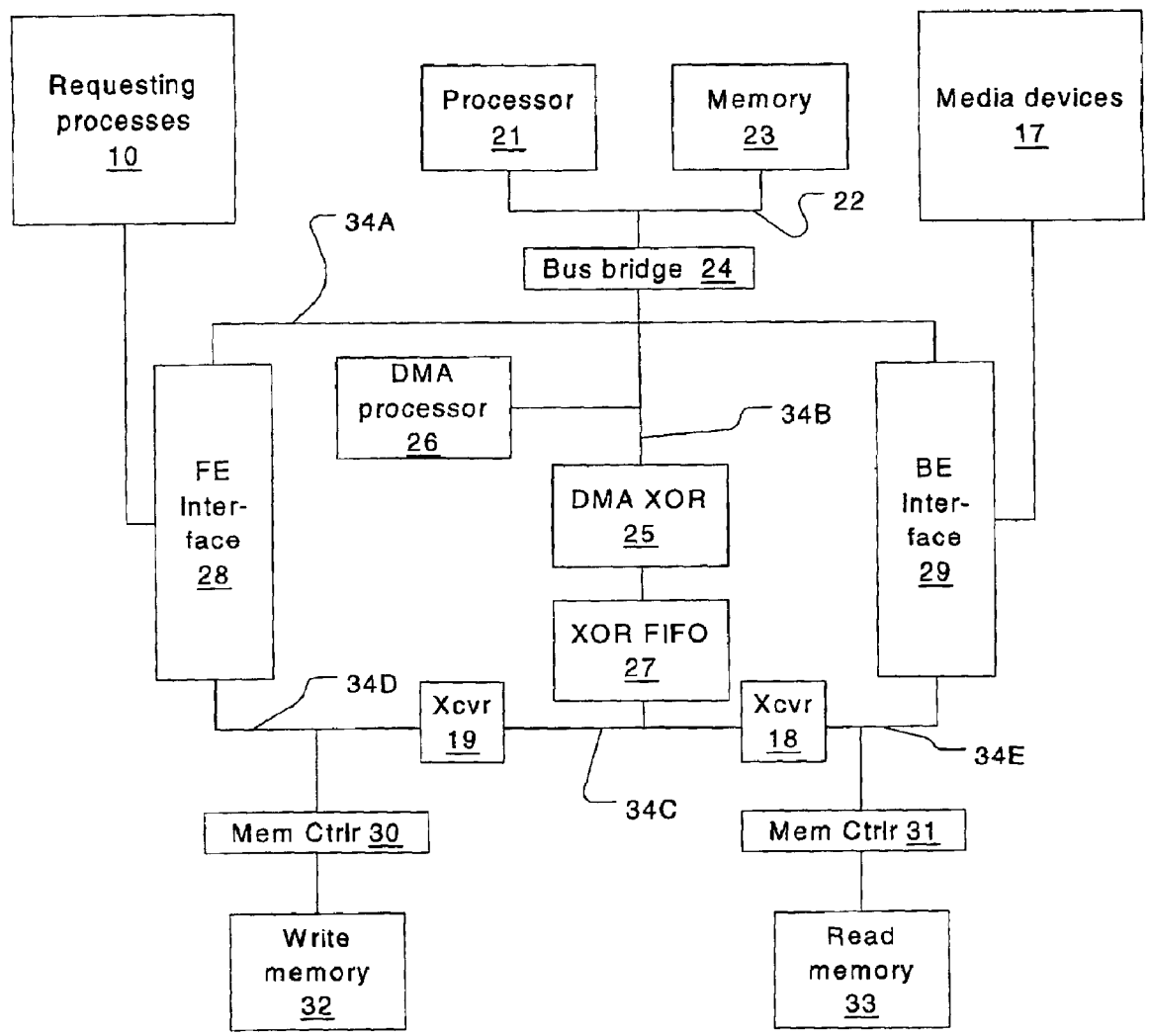
FIG. 2A is an illustration of a prior art storage processor device in which a control processor was used to control a DMA, but which was not involved directly in processing user data, thereby liberating the processor of performing the calculations necessary to reconstruct sectors from parity data, perform error checks, and keep informed of changes to user data.

Referring now to FIG. 2A, a prior art storage processor device has a control processor 21 to control a DMA/XOR engine 25. The control processor 21 is not involved directly in processing user data, thereby liberating the processor of the burden of performing the calculations needed to generate parity data, reconstruct sectors from parity data, perform error checks, and keep informed of changes to user data. Data is carried by a first bus 34 between a front end (FE) interface connected to requesting processes 10 and a back end (BE) interface connected to media devices 17 through write and read memories 32 and 33. User data is transferred between the FE interface 28 and the write memory 32. The data is operated upon (e.g., CRC generated, addition of parity blocks, time stamps and other meta-data, etc.) by the DMA/XOR engine 25 and transferred to the read memory 33. The DMA/XOR engine 25 then transfers the user data from the read memory 33 to the BE interface 29. The control processor 21 issues commands through a bus 22 via a bus bridge 24 and bus 34b to the DMA/XOR engine 25, which is controlled by a DMA processor 26. Bus 34A carries control data from the FE and BE to the Processor 21. Bus 34C carries user data. The user data and control data in the device of FIG. 2A separated user data and control data so that the processor 21 and the processor bus 22 was not burdened by information relating to changes in user data stored in read and write memories 32 and 33. The FE- and BE-attached devices (requesting processes 10 and media devices 20, for example) communicate their requests to the control processor 40 by storing requests for actions in the control memory 23 and interrupting the processor. The respective requester may transfer user data to a respective memory (32 or 33) independently. The processor then generates instructions in queues located in control memory 23 which the DMA processor 26 accesses and executes.

User data going from FE to BE or vice versa can be moved into a respective memory and read and processed in parallel processes so that data can move at speeds approaching the capacity of the buses (34C, 34D, and 34E). This can be true even though the user data may need to be reconstructed or when new parity blocks have to be generated as new data is written to the BE. However, this assumes there is no need for simultaneous bidirectional traffic between the DMA/XOR engine 25 and XOR FIFO 27 and one of the read or write memories 33 and 32. This is because the transceivers 19 and 18 enable transfers of user data in only one direction at a time.

Figure 2B:
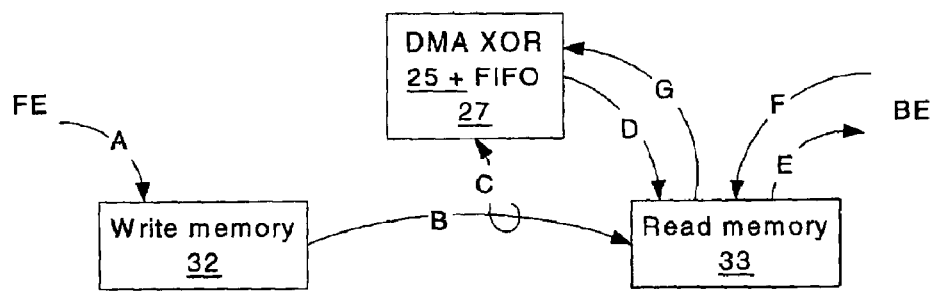
FIG. 2B is a diagram illustrating parallel processes for multiple threads to show how throughput can approach bus speed even with reconstruct and parity generation.

Referring now to FIG. 2B, arrows represent continuous streams of data between FE, BE, and DMA/XOR processes for multiple simultaneous threads all of which are assumed to be writes of new data including small block transfers for which both old (from the BE) and new data (from the FE) are required for generation of non-longitudinal parity data. User data transfers from the FE interface 28 and write memory 32 are represented by the arrow A. User data transfers from write memory 32 to read memory 33 are represented by arrow B. Arrow C represents data snooped by the DMA/XOR engine 25 and used for parity calculations with the XOR FIFO 27. Arrow D represents the results of parity calculations to be transferred to the BE and arrow E, the data to be transferred, including the stream represented by D, to the BE. The arrows F and represent old data required for calculating new parity sectors which must be transferred from BE through read memory 33. Note that there is opportunity here for significant I/O parallelism. However, since the transceiver 18 is present, it is not possible for data to be simultaneously read into the XOR FIFO 27 from read memory 33 and out of the XRO FIFO 27 into read memory 33. Even though programming may interleave the processes of multiple threads, some degree of attenuation of throughput due to the inability to transfer data from the bus 34E and 34C bidirectionally.

Figure 2C:
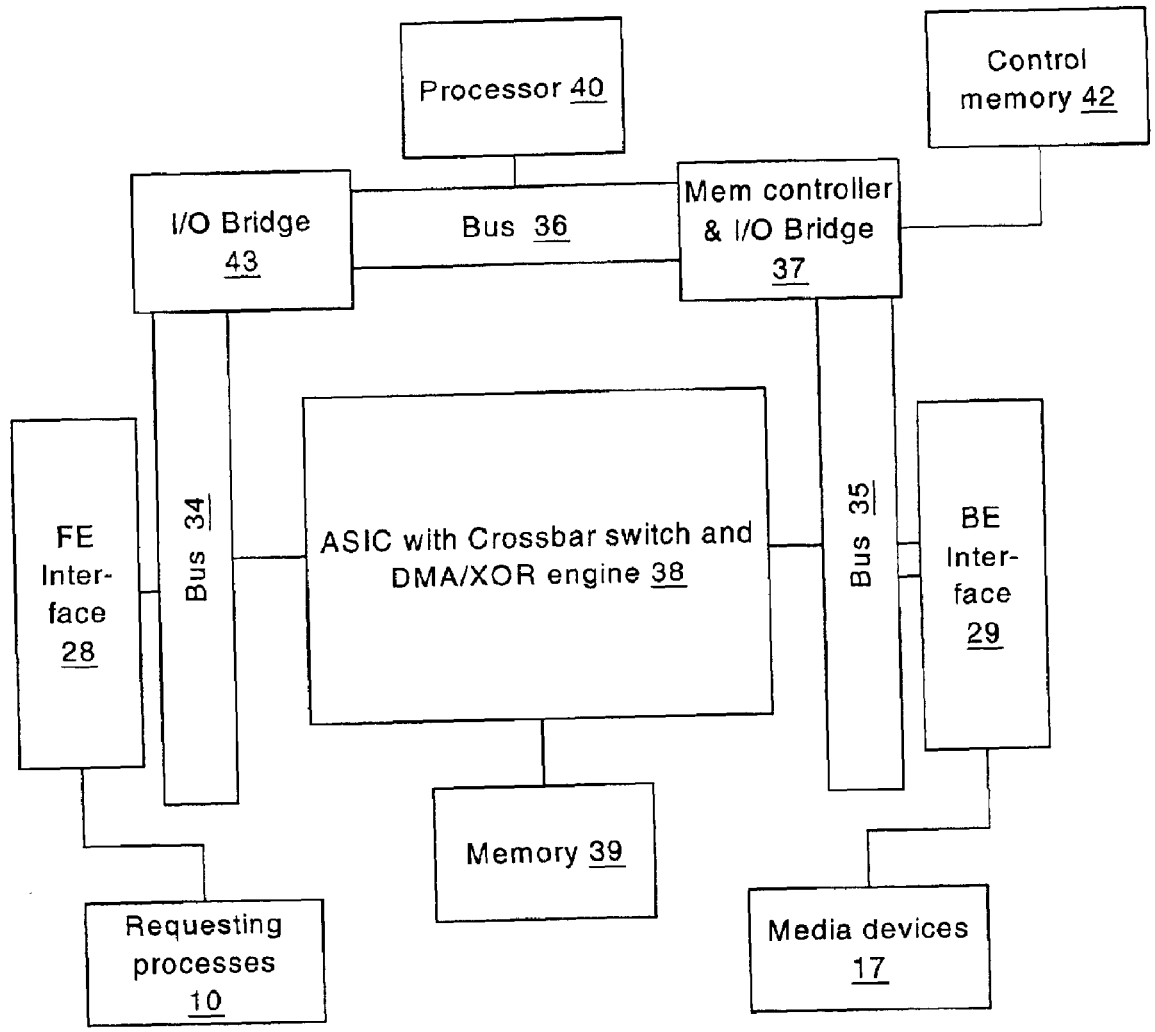
FIG. 2C is a another storage processor device supporting features of the present invention which has the same advantages as the device of the prior art, but which is capable of providing faster throughput and is more expandable.

Referring now to FIG. 2C, in a different storage processor device, the DMA and XOR engine are combined in an ASIC with a crossbar switch that links FE and BE buses 34 and 35 with a single user memory 39. A FE interface 28 communicates with a control memory 42 through buses 34 and 36 bridged by an I/O bridge 43. A BE interface 29 communicates with the control memory 42 directly by way of the bus 35, which is connected directly to a memory controller and I/O bridge 37. Only control data is carried through the I/O bridges 43 and 37. In this embodiment, a single memory 39 is used instead of separate read and write memories 32 and 33. This permits user data to be moved in a single hop between FE and BE. User data that does not need to be translated or manipulated by the DMA/XOR engine 25 need not be written more than once on its way between FE and BE, which reduces the data load on the memory channels (buses for example). Although the read and write memories 33 and 32 of the device of FIG. 2A may be capable of simultaneous read and write from the same memory, the write channel of each must be burdened with the same user data (although possibly altered by the addition of meta-data). The use of read and write memories 33 and 32 created a store and forward configuration, which enabled parallelism because the FE could transfer to/from the write memory 32 while the BE transfers to/from the read memory 33 simultaneous with transfers from write memory 32 and read memory 33 with snooping by the DMA/XOR engine 25. In contrast, in the configuration of FIG. 2C, which shares many common features with preferred embodiments discussed in connection with FIGS. 3–12, data is written to memory 39, operated on as appropriate, and then read from memory 39. As is discussed with regard to FIGS. 10–12, this can be managed in such a way as to provide a high degree of parallelism and ensure high throughput of user data. As discussed above, this is advantageous for large file transfers with a minimum guaranteed bandwidth such as streaming data.

Figure 3:
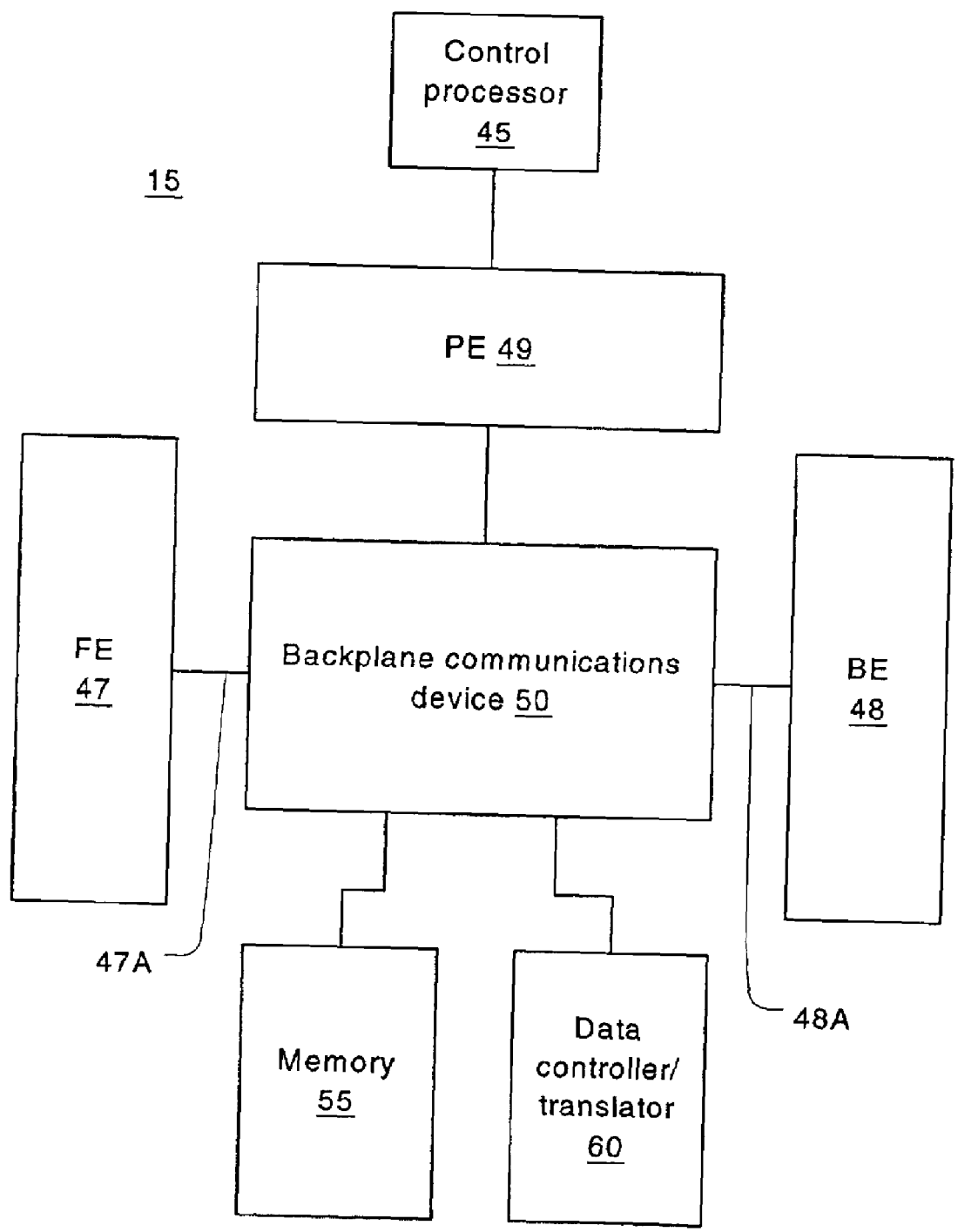
FIG. 3 is a figurative representation of a storage processor according to a preferred embodiment of the invention.
Figure 4:
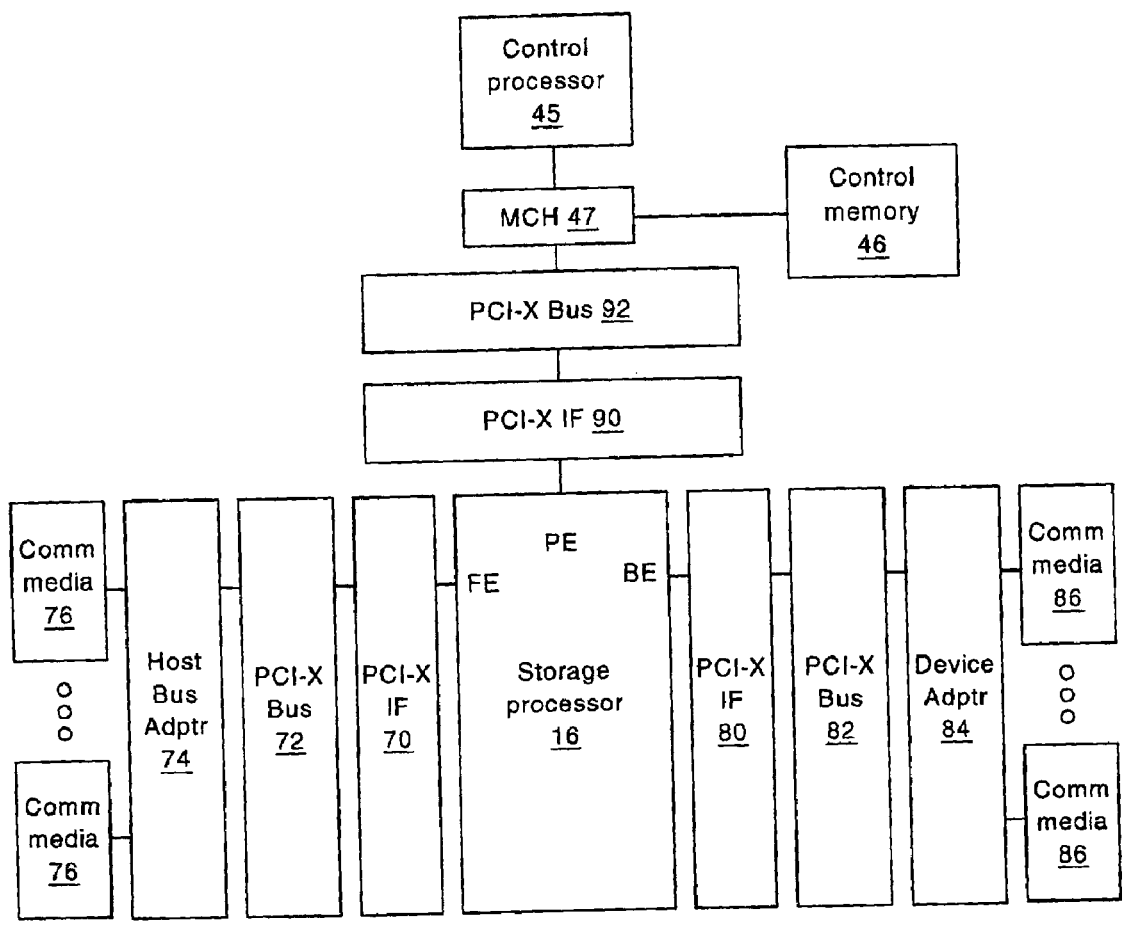
FIG. 4 is an illustration of a storage processor showing interfaces to requesting processes, storage, and control processor devices.

Referring now also to FIGS. 3 and 4, in a preferred embodiment, the storage processor 15 may include a FE interface 30 to support connection to the requesting processes 10 and a back end (BE) interface 48 to support connection to the media devices 17. A processor end (PE) interface may support connection to a control processor 45. A backplane communications device 50 may serve as a data conduit for supporting communications among the devices shown. A memory 55 may provide data buffering and other temporary data storage for supporting devices shown. A data controller/translator 60 may govern specific data transfer and translation operations, which may involve the calculation or processing of error checking and/or error correcting data. The data controller/translator 60 may execute its functions in response to control commands from control processor 45 connected through the PE interface 49. The processor may be connected through a memory controller hub (MCH) 47 and through it address its own dedicated control memory 46.

The backplane communications device 50 may consist of one or more buses, switches such as crossbar switches, direct connections, or combinations thereof. Together, the backplane communications device 50 defines a set of communications channels, which may include buffering, data translation, and control operations such as arbitration. The FE interface 47 may include temporary storage such as buffers, control logic, and other functions and is preferably substantially identical to the BE interface 48. Not shown explicitly, although they may be included within or external to the interfaces 47, 48 and 45, are: protocol support for the connections to the external devices. For example, as illustrated in FIG. 4, an interface for an external bus such as PCI-X 70 or a network adapter such as an Ethernet or Infiniband (not shown) may be provided and further adapters for connecting to the host or media may be provided. For example, the interface to the FE and BE interface could include a PCI-X interface 70, 80, a PCI-X bus 72, 82, a PCI-X to host adapter 74, 84 for the external protocol/media 76, 86. The latter may, for example, act as a bus master and protocol translator. The PE interface may be connected to another external adapter, for example, PCI-X by a PCI-X interface 90, a PCI-X bus 92 to which the processor is connected. In the above example, the PCI-X 70, 80, 90 interfaces or other interfaces on the storage processor 16 side of the bus could be integrated in a single device, such as an ASIC.

Physically, parts of the interface could be provided on the same device as the components shown in FIG. 3 or externally. For example, the components plus the interfaces (not shown) could be burned on a single chip (ASIC) or programmed on a field programmable gate array (FPGA). The memory 55 could include any type of high speed memory subsystem such as one or more RAMBUS channel.

Figure 5:
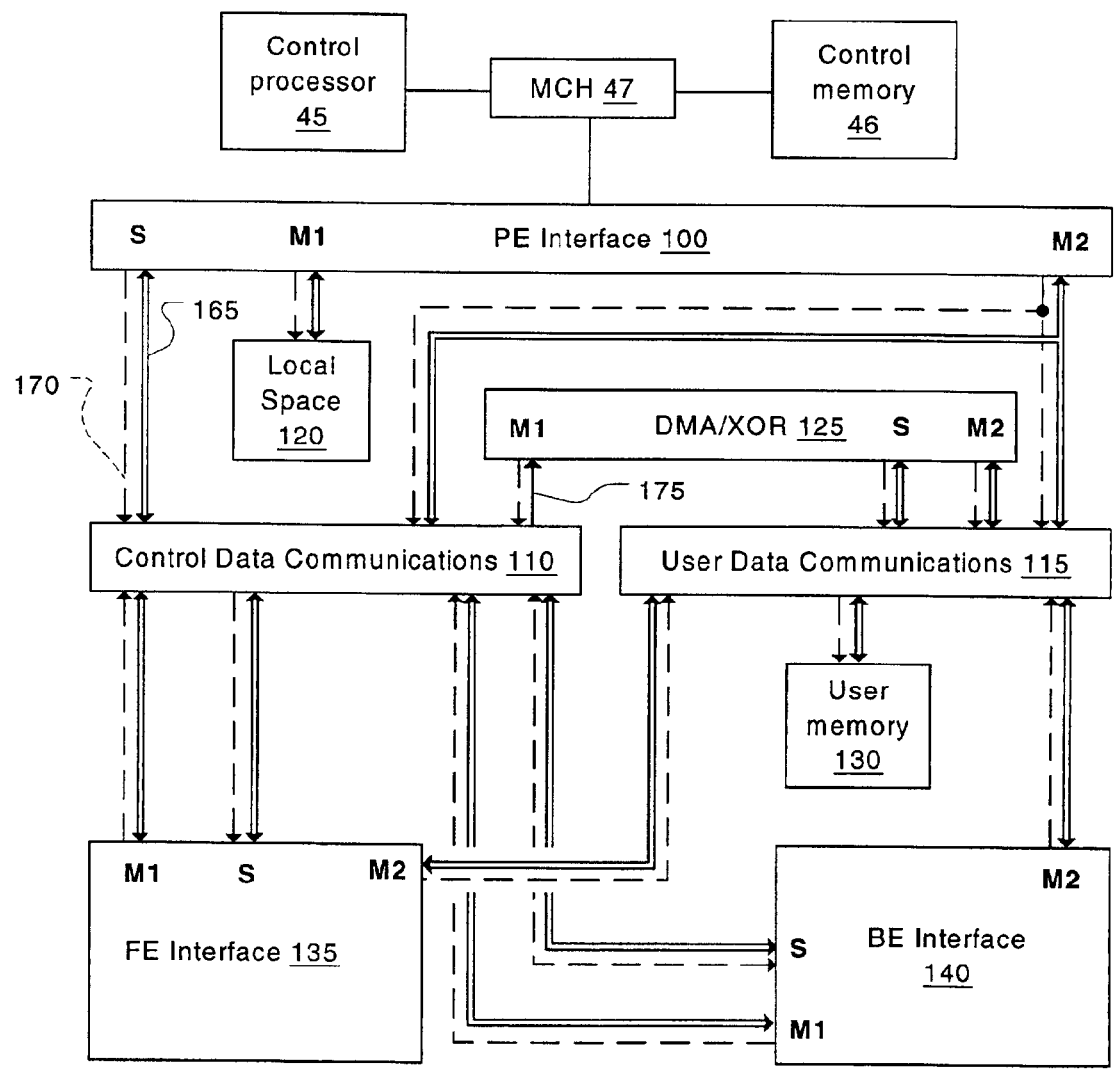
FIG. 5 is an illustration of various details of a storage processor showing data path components, memory, and control devices.

In a preferred embodiment of the invention, the backplane communications device 50 provides parallel data paths between selected devices as discussed below. Referring now to FIG. 5, the PE, FE, and BE interfaces 100, 135, and 140 of a preferred embodiment represented more figuratively in FIG. 3 are connected via one or more crossbar switches and/or direct connections represented by control data communications device 110 and a user data communications device 115. In the preferred embodiment, structurally, the latter represent a switch or other device capable of providing parallel or high bandwidth communications between the devices, preferably in parallel. Also, some communications channels may be provided by direct links because of a lack of contention or other considerations such as economies in fabrication. In FIG. 4, the fact that separate data communications devices for user and control data 110 and 115, is not intended to indicate that it mirrors a structural feature. Both may be subsumed in one switch or other device or may result from the combined behavior of multiple devices.

In the preferred embodiment of FIG. 5, the data controller/translator 60 may correspond, at least in part, to a DMA/XOR engine 125 and the memory 55 to memory 130.

The local space 120 is an abstraction of any semaphores, temporary data stores, hardware or software state machines, etc., which provide information to the control processor 45 and are primarily accessed by it. Broken lines as indicated, for example, at 170 indicate channels permitting the transfer of address information. Solid lines as indicated for example at 175 indicate channels permitting the transfer of data. The latter lines have arrows to show the direction in which the respective classes of data may flow. The solid lines appearing in pairs with double arrowheads, as shown, for example, at 165, indicate channels permitting two-way transfer of data. Figuratively speaking, the control data communications device 110 and the user data communications device 115 is an abstraction which represents any suitable communications fabric permitting, at least to some degree, simultaneous two-way transfer of data from one channel to another connected channel.

The two-way data channels (e.g. at 165), as said, may permit simultaneous data transfer in both directions. The bandwidth may be any suitable, but in a preferred embodiment, each channel is a switched parallel path that is 64 bits wide. The addressing lines may provide any chosen bandwidth, but in the preferred embodiment, they are switched parallel paths 32 bits in width.

Referring back to FIG. 1A, requesting processes 10 make requests to write and read data to and from the media devices through the storage processor 15. The requests may include address data and user data, the latter including the data that is to be stored, if the request is for a write to the media devices. Normally, the requesting process 10 requests contain no information relating particularly to details of the media devices, which may include, for example, magnetic disks in a RAID array. That is, the addressing scheme employed on the requesting process 10 side of the storage processor 15 may uniquely point to the particular data content being requested, but have no relevance in terms of where the data is stored. The storage processor 15 must translate from the address provided by the requesting process 10 and the addressing scheme used to identify the location or locations where the data is stored in the physical media devices 17. The address translation process can involve substantial machinations, particularly because a particular set of data requested, a file for example, may be divided into a number of non-contiguous blocks, requiring the use of devices to reassemble the scattered pieces of data, for example, scatter-gather lists (SGLs) which may identify the various media device 17 side addressing and ordering of discontinuous sequences of data.

In addition to the above-noted address translation process, the storage processor 15 may perform calculations to support error detection, error correction, encryption coding, compression, or other types of calculations. The results of such calculations may include the appending of data to the user data stored on the media or the morphing of user data to another form or a combination of both. Data derived from calculations may be added to other housekeeping data, the combination of which is often categorically referred to as "metadata," such that the user data stored on the media devices 17 is different, at least in part, from that passed by the requesting processes 10 to the storage processor 15.

Due to the above addressing translation and calculations as well as the translation among protocols including their respective communications channels, the storage processor 15 has the potential to move data very slowly, which is counter the demands of requesting processes 10. Delays can manifest due to long latency (slow access and retrieval) or low throughput (low rate of data transfer). To address this, the slowest data transfers and/or calculations may be done in parallel by suitable construction of the storage processor 15 and attached systems. But parallel data and computation paths present ordering and coherency issues. These may be addressed by various features of storage processors, as described above and below, which include judicious choice of processing/transfer routes configured for parallel operation, and several mechanisms for prioritizing and control of ordering of events.

Referring again to FIG. 5, when a requesting process 10 makes a transfer request, control data indicating the request is sent to control memory 46. The transmission of the request may involve translation and various steps such as storing the request in a queue, buffering it, determining its priority, etc. and these may be performed by an external device, for example the host adapter 74 as shown in FIG. 4. The control processor 45 may learn of the request in its memory by various means such as a program loop executed thereon to poll a request queue stored in control memory 46 or by the requesting process 10 invoking an interrupt signal. The host adapter 74 may generate the latter, for example through the extant chain of interfaces (e.g., PCI-X bus 72, PCI-X bus interface 70, and FE interface 42).

The reason for initiating a transfer in this way is so that the storage processor 16 may handle data that relates to where and how the requested data is to be transferred to the storage processor 16. In the embodiment of FIG. 5, data to be stored is first placed in user memory 130 and then processed from there. The control processor 45 may thus respond to the request by determining what areas of user memory 130 are available and what areas should be used to meet the request. Because non-contiguous portions of memory may be required to satisfy the request, the control processor 45 may transmit a scatter-gather list (SGL) (for example by placing in control memory and transmitting a pointer or by some other means) to the host adapter 74 to indicate the portions of the user memory 130 that should be used for the transfer. To minimize the burden on the control processor 45 for this step, the control processor 45 may place the SGL in its control memory 46, from which the host adapter 74 may fetch it.

Once the host adapter 74 has the SGL, it can then place the data to be stored into user memory 130 as indicated by the SGL and notifies the control processor 45 that the data is ready. To minimize the burden on the control processor 45, in the preferred embodiment, the host adapter 74 may invoke another interrupt to provide this notification.

In the preferred configuration of a storage processor 15/16 the above data transfer does not occur in a serial fashion. Preferably, the storage processor 15/16 is configured to allow multiple threads to run simultaneously and for multiple data transfer operations to occur simultaneously. Thus, for example, the host adapter 74 is preferably permitted by the control and data communications devices 110 and 115, to send its data to the storage processor 15/16 and then move on to its next step. The storage processor may accomplish this by providing in the control and data communications devices 110 and 115 caching or buffering. The use of caching implies that duplicate copies of data that corresponds to certain addresses in memory are established and a set of formal mechanisms to address these. In a preferred embodiment, a simpler scheme is employed in which the data transferred by the host adapter 74 is accepted in chunks to allow the host adapter 74 to process other threads rather than wait for all the data to flow into the destination. The data paths leading through the control and data communications devices 110 and 115 to the memory 130 may also include buffers to allow simultaneous data traffic in the storage processor 15, 16 to share common channels. The latter is discussed further elsewhere in the instant specification. The situation that may exist however is that after the final set of data is moved into a buffer in the storage processor 15, 16, the host adapter 74 may then invoke the interrupt and move on with the processing of other threads before the data arrives fully in the memory 130. This presents an ordering problem. If the control processor 45 begins an operation on the data in the locations where the user data are expected to be found, the wrong data will likely be processed. Interrupts are preferably employed to control the flow of various simultaneously executing threads with buffered data transfers because they are inherently minimally burdensome on the requested devices, but in they can also lead to ordering problems such as identified above. These may be addressed as discussed elsewhere in the instant specification.

Typically, as discussed previously, the data that is actually stored to the media devices 17 may take up more memory than the data offered up by the requesting processes 10. As may be recognized by those of ordinary skill, the transfer of data to contiguous portions of a memory can normally be performed much faster than to many non-contiguous portions of memory. Many storage systems deliberately package data in blocks and pair each to a set of metadata with an original set of data and an appended set of metadata. For example, the incoming user data may be divided into 512 byte blocks and 8 bytes of metadata added to each. As the incoming data is stored in memory, the metadata may be generated and then added to each block so that the memory contains successive blocks of 520 bytes. When it comes time to transfer the incoming data from memory to the media devices 17, the high speed contiguous transfers can be used. The latter situation is called back end friendly. Alternatively, the data can be written to the memory 130 in successive 512 byte blocks using high speed contiguous transfers and the metadata appended as the user data is transferred to the media devices 17. This situation is called front end friendly. In a preferred embodiment, the SGL used to transfer data into memory 130 (or transfer data out in a similar process) may be generated such that they separate the incoming data into blocks such that metadata is in memory. Alternatively, data may be transferred into and out of memory 130 using high speed contiguous transfers by padding the 520 byte (520 bytes is used in the example, but not limiting of the technique) blocks when data is transferred to or from memory 130 from the requesting process 10 side. Either system is inherently back end friendly. Various techniques may be employed to provide the padding data, such as a front end process that add the data to a source memory (not shown) before the transfer to the user memory 130.

In a preferred embodiment, upon receipt of the transfer request, the control processor, in addition to supplying a SGL to the requesting process host adapter 74, may program the data controller/translator 60 to process the data in memory. The process may involve any or all the calculations mentioned above, for example, error checking data (e.g., cyclic redundancy check or CRC), implementation of data compression algorithms, generation of error correcting data, and addition of records such as so-called time and date-stamping. In the preferred embodiment, the control processor 45 defines multiple instruction queues in control memory 46 or user memory 130 and places the instructions for the requested operation in a queue based on a priority assigned to the queue. When the data controller/translator 60 completes all the instructions in a current queue, it may interrupt the control processor 45 indicating a request for assignment to a next queue of instructions to execute. By operating in this manner with multiple queues, it is possible for software run by the processor 45 to prioritize the tasks performed by the data controller/translator 60. Also, the processor 45 may specify in its instructions to the data controller/translator 60 what points or upon what events the processor 45 should be interrupted. For example, when the data controller/translator 60 has finished operating on data in the user memory 130, the Data controller/translator 60 may interrupt the processor, as indicated in a set of instructions in the queue. Also, the data controller/translator 60 may, by default, interrupt the processor 45 each time it reached the end of a current instruction queue. It could then be reassigned to start again with the same queue (with new instructions) or assigned a different queue. Preferably, at least some of the queues are maintained in control memory and most preferably all are maintained in control memory. Because the language of the commands generated by the control processor 45 is a high level language, the amount of memory space required by the queues can be small, which means a smaller control memory 46 may be used for this purpose.

Preferably, the DMA operates in a pipelined mode at least to the extent of performing a pre-fetch of its successive instruction in parallel with a currently executing instruction. Also, preferably, the commands transferred to the input queues of the DMA/XOR engine 125 by the control processor 45, are high level commands to minimize the burden on the control processor 45. The machine language commands addressed by these higher level commands may be stored in any suitable memory space and preferably a space that is quickly accessible by the DMA/XOR engine 125 and which may be addressed by the control processor or other device outside the storage processor 15/16 such that these machine language instructions can be redefined as required. In a preferred embodiment, the machine language instructions are stored in a SRAM to support high user data throughput.

The memory 130, in the preferred embodiment, may include multiple addressing and data channels each of whose widths are the same as those of the data channels defined by the control and user data communications devices 110 and 115. For example, in an embodiment, these channels are 64 bits wide. One way to use the multiple memories and channels is to move data in synchrony such that the bandwidth of the memory 130 is a multiple of the data channel widths. A preferred way to employ the memories, however, is to spatially demultiplex data transfers to permit parallel operation. For example, read and write operations, through two separate channels, may be performed simultaneously. Since the storage processor 15/16 supports multiple threads and a high degree of parallelism in data transfer, such a use of the memory channels is preferred over synchronous operation with the attending burdens entailed in operating synchronously, such as translating channel widths. To permit posting and thereby promote continued parallel operations by requesting devices, preferably, the user memory 130 is equipped with addressing queues to permit multiple read and write requests to be posted.

As indicated in FIG. 5, the data controller/translator 60 may include (or be substantially coterminous with) a direct memory access (DMA) engine and XOR engine 125. The latter preferably includes at least one first-in, first-out (FIFO) buffer configured to generate and hold a computed XOR value in its memory cells as each data block is transferred through it, until it is reset. It can be any width or depth, but in an embodiment, is one bit deep and some number of bits wide for which a parity value is desired. Data may be passed through the XOR FIFO as it is placed in memory, as it is withdrawn from memory, or it may be drawn, computed and the data replaced in memory in an intermediate operation.

An XOR FIFO may also be employed to accumulate sector parity, for example, RAID 5 data sectors, may be retrieved through the BE interface 48 under control of the DMA XOR engine 125. The first sector of RAID 5 storage "stripe" may be fetched from the media devices 17 and placed in the XOR FIFO. Other sectors from the same stripe may then be fetched and XORed with the previous contents of the FIFO. This process may continue until all of the sectors of the stripe have been processed. The final product of the XORs is the parity calculation or re-generation of the data for a particular RAID 5 stripe. The process of generating the parity sector is analogous.

The advantage of the XOR FIFO is that a minimal amount of ASIC logic and RAM storage is needed to process the stripe parity calculation or regenerate the stripe data. Also, it is not necessary to fetch all the stripe's sectors before the parity calculation or data re-generation is started. This allows greater amount a parallelism to exist and therefore reduces the amount of time it takes to process the data stripe.

Once the data is in user memory 130 and the DMA/XOR engine 125 has finished processing it, the DMA/XOR engine 125 may generate an interrupt to the control processor 45. At some time beforehand, the control processor 45 may generate a SGL and place it in control memory 46 or it may do so in response to the interrupt request from the DMA/XOR engine 125. The SGL may be fetched by the BE device adapter 84 from a queue of transfer requests. The latter may be maintained in control memory 46 or in user memory 130 or in another memory (not shown) as desired. Preferably, the transfer requests are stored in control memory 46 to minimize the time burden on the control processor 45.

Once the device adapter 84 has completed the transfer of data from user memory 130 to the media devices 17, the control processor 45 may generate an acknowledgement message or information to be included in one and place that in control memory 46. The control processor 45 may then signal an indication to the device adapter 84 that the information is ready and the FE host adapter 74 may send the message to the requesting process 10.

Figure 6A:
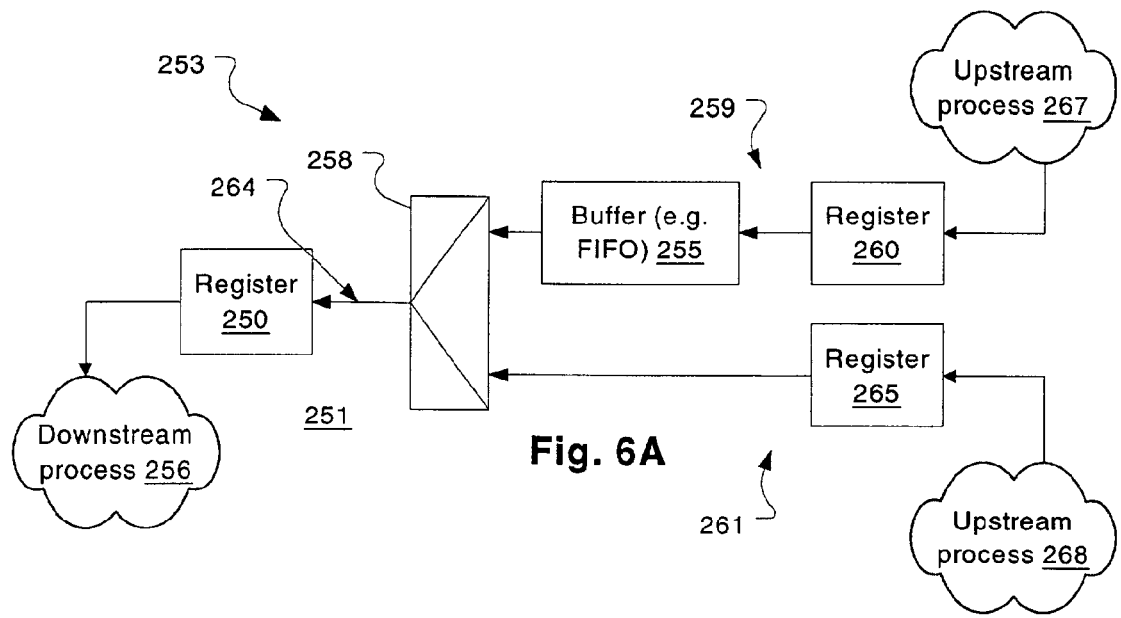
FIGS. 6A and 6B illustrate data path features incorporating a look-aside buffer that may be included in various embodiments of the invention.

Referring now to FIG. 6A, the control and user data communications devices 110 and 115 as well as the FE, BE, and PE interfaces 100, 135, and 140, constitute a communications fabric that provides a store and forward function by means of various buffering components 251. These buffering components 251 may be configured to support priority allocation of communications channels as well as a mechanism to permit data to be posted by a transmitting process (any of various devices connected to the fabric) without requiring the transmitting process to wait. The configuration illustrated at 253 is arbitrary and for purposes of general description only and is not intended to be limiting beyond the discussion that follows. The registers 250, 260, 265 introduce an N-clock (preferably single-) cycle staging component. The multiplexer 258 chooses between two signal paths 259 and 261. The signal path 259 contains a buffer 255 to permit data to be accepted from an upstream process 267 immediately by the second signal path 259, even if a downstream process 256 is not ready to accept data. The buffer 255 permits the upstream process 267 to post its data and continue without interruption despite the fact that a shared channel 264 may be busy carrying data from another signal path 261. By permitting data to be buffered in this manner, priority may be given to the signal path 261 for the transfer of data. In an embodiment, this may be used in the environment of a storage processor 15/16 to promote high throughput by giving priority to user data being transferred between BE and FE. This priority may be granted under hardware or software control. For example, the multiplexer 258 and downstream process 256 may be controlled such that data on the signal path 259 is always held up in the buffer 255 until the signal path 261 is cleared. For example, the signal path 261 may be used to carry user data going between BE and FE and signal path 259 to carry control data, thereby giving priority to the user data.

Figure 6B:
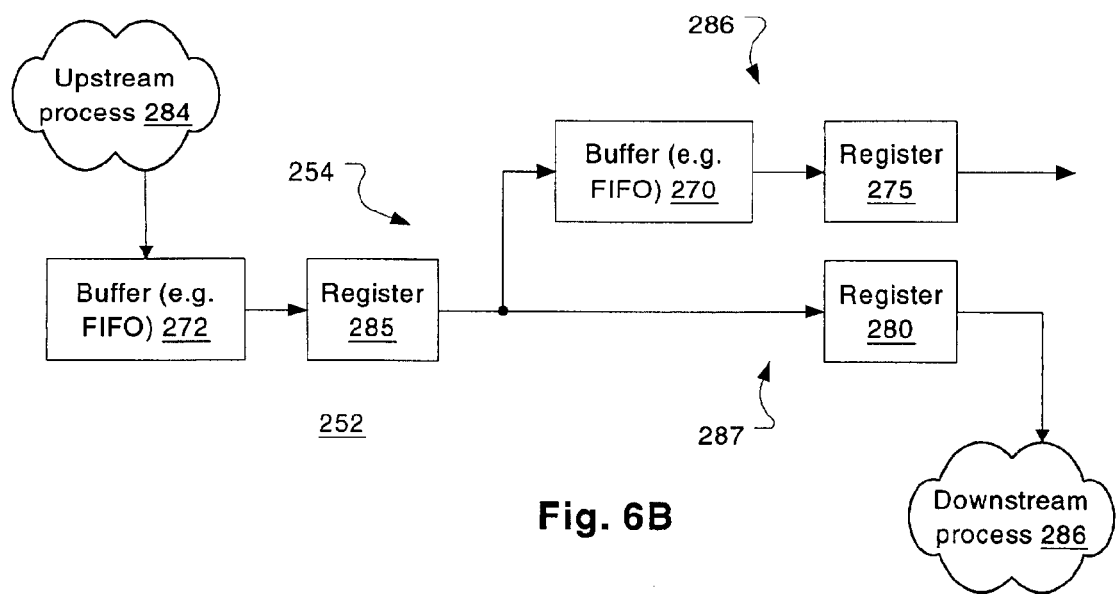

Referring to FIG. 6B, a buffer 272 receives data transmitted from an upstream process 284. The data in the buffer 272 is read by either a downstream process 286 or a buffer 270. The upstream and downstream processes 284 and 286 may include buffers, switches, storage devices, processors, buses, etc. The buffer 270 is contained in a first data path and the downstream process 286 in a second data path. Registers 285, 275, and 280 may be provided to insert a single cycle staging element.

Either of the embodiments of FIGS. 6A and 6B may be used to help to insure that shared data paths are flushed of non-critical data quickly to sustain more critical data, for example, that required to sustain high throughput. As discussed above, that the maintenance of high throughput may be one of the features of the storage processor 15. In the embodiment of a storage processor shown in FIG. 6C, buffers and data path connections are provided to keep a shared data path 420 flushed of control data being transmitted from a FE interface 465 to a PE interface 460. That is, for example, control data may be sent from the requesting process 10 to the control processor 45 along the shared data path 420, which includes a processor end FIFO buffer 410. The shared data path 420 leads to a control branch 423 that is connected through a data switch 475, with a demultiplexer 425, to a processor end branch 430, which applies control signals to the PE interface 460. Immediately after a junction 484, on the control branch 423, a look-aside FIFO buffer 405 is configured to read control data from the shared path 420. The effect of this is that the control data does not need to wait for the data switch 470 and processor end buffer 410 to ready to transmit the control data through the control branch 423. The shared data path 420 also leads to a user data branch 423 that is connected through the data switch 475, with a demultiplexer 425, to memories 481 and 482, which applies data signals to the memories 481 and 482. By providing the look-aside FIFO buffer 405 in this branching configuration as shown, user data is free to flow into memory along the shared data path 420 and the user data branch 423 without waiting for control data to be accepted upstream. An alternative to the above configuration is to provide a separate port in the FE interface 465 for user and control data.

Note that there may be multiple instances of branches with look-aside buffers as the FE, BE, and PE interfaces 465, 455, and 460 may be essentially identical. Also note that the components shown, which include bus interfaces (e.g., PCI-X cores) on each of the FE, BE, and PE interfaces 465, 455, and 460, switches, etc. may be formed on a single ASIC for high reliability and speed.

Referring now to FIGS. 3, 4, 5, and 8A, a first flowchart summarizes the process of transmitting information through the storage processor 15 from the requesting process 10 to the media devices 17 or other devices outboard of the BE interface 48. In a RAID system, this would be a process responsive to a write request. In step S10, the requesting process 10 generates a transfer request to store information on media devices 17. In step S15, the host adapter 74 accepts the request and places a request in control memory 46. In step S20, the host adapter generates an interrupt to indicate to the control processor 45 that a request is in control memory 46. Next, in step S25, the control processor 45 generates allocation data, for example, an SGL and outputs it to control memory 46. The host adapter 74 then posts the user data for which the request was generated to the storage processor 16 FE interface 47. The latter is connected to the backplane communications device 50 (or the equivalent user data communications device 115), which as discussed above, provides a store and forward communications fabric that allows the user data to be offloaded quickly and may take some interval to be transmitted to its destination(s) in user memory 130.

In step S35, after completing the posting of user data, the FE host adapter invokes a maskable interrupt to the control processor 45. The FE host adapter makes no attempt to control the timing of the interrupt or any ordering issues that arise despite the fact that, as illustrated in step S40, the user data may still be proceeding to user memory 130 at the time the interrupt is invoked. To prevent the interrupt from being responded to by the control processor 45 before the user data is in user memory 130, the interrupt is masked at step S36 until it is determined at step S37 that the data has been flushed from the data paths 165, which, as discussed above may contain buffers.

Figure 9:
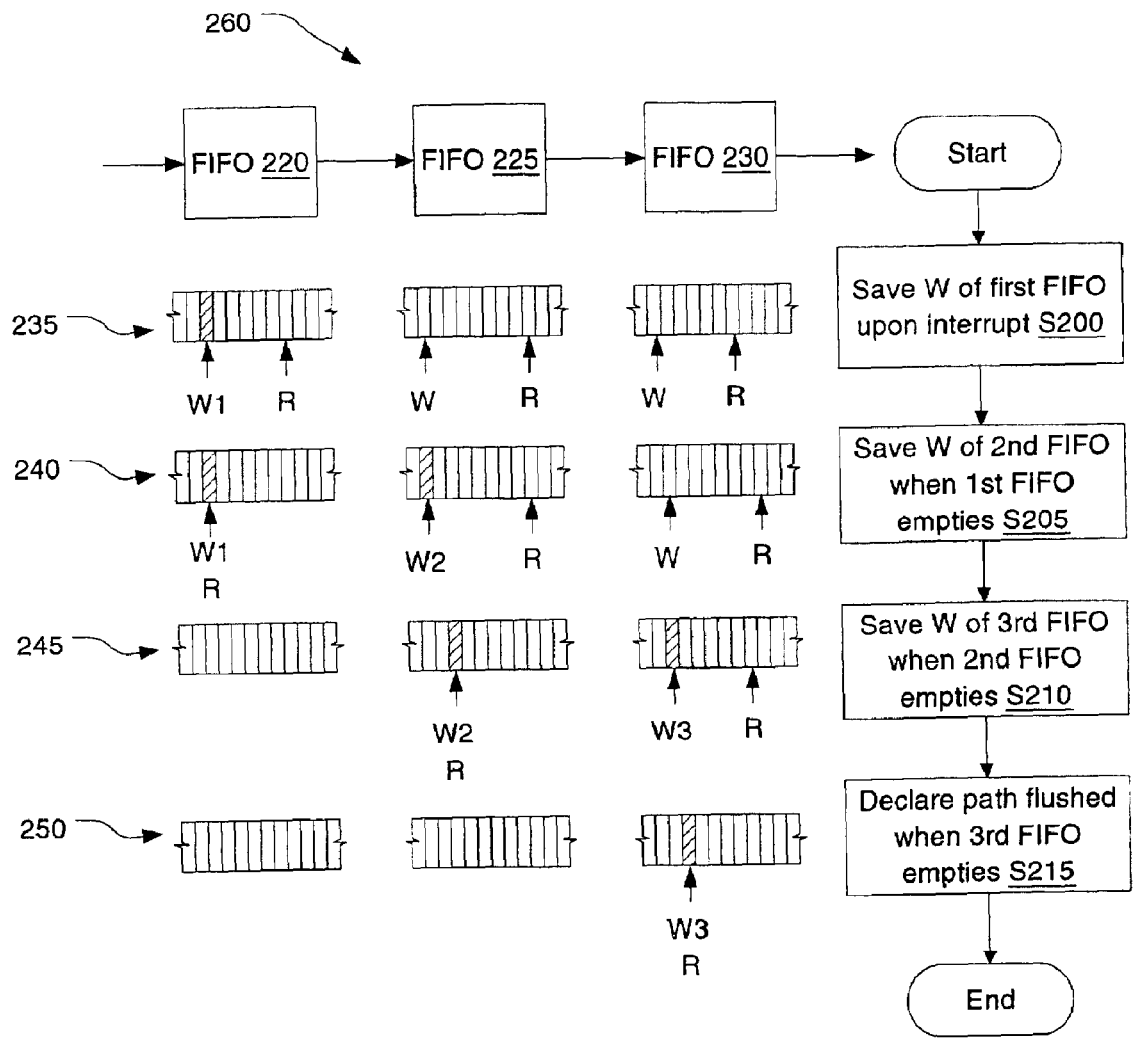
FIG. 9 illustrates a technique for determining when a data path is flushed of data relating to an interrupt.

A number of techniques may be used to determine if the data path is flushed. For example, an end of transmission symbol may be sent as the last word on the data path and detected when it arrives in user memory 130. According to a preferred method, the line may be determined to be flushed by hardware logic. Referring momentarily to FIG. 9, an arbitrary communication path 260 in the control and user data communications devices 110 and 115 includes a series of FIFO buffers 220, 225, and 230. Data is written to the first FIFO buffer 220 and is read from the last FIFO buffer 230. The communication path 260 is flushed only when the last data word written to the first FIFO buffer 220 is read from the last FIFO buffer 230. FIG. 9 shows an algorithm that may be implemented in software and/or hardware to determine when, upon the posting of the last data word to be operated on in response to an interrupt, when that last word has been flushed from the path 260. Preferably the implementation is done without involvement of the control processor 45 or the DMA/XOR engine 115 (or equivalently, the data controller/translator 60). FIG. 9 assumes the FIFO buffers are implemented with pointers in a memory, which is the most common type of implementation, but the equivalent can be implemented using shift registers or any other type of FIFO. First, in step S200, the write pointer of the first FIFO buffer 220 is saved in response to the interrupt. For example, hardware logic may detect the leading edge of the interrupt signal and save the value of the write pointer at that instant to a memory register. Step S205 is executed when the first FIFO buffer 220 empties (R=W1) of data following the interrupt (target data), the write pointer of the second FIFO buffer 225 may be stored in a register (not indicated in the drawings). Step S210 is executed when the second FIFO buffer empties of the target data and the write pointer of the third FIFO buffer 230 is saved to a register. Step S215 executes when the third FIFO buffer 230 empties of the target data and the path is declared flushed at that point. The interrupt mask may then be withdrawn and the control processor 45 may respond accordingly.

Note that registers for storing FIFO pointers and/or flags that may be used to provide the logical control of FIG. 9 or alternative embodiments are indicated figuratively as local space 120. The local space 120 is not necessarily localized as indicated in the figure. The indication is only an abstraction to show that other storage for various data used in controlling the processes of the storage processor 15 exist.

Figure 7A:
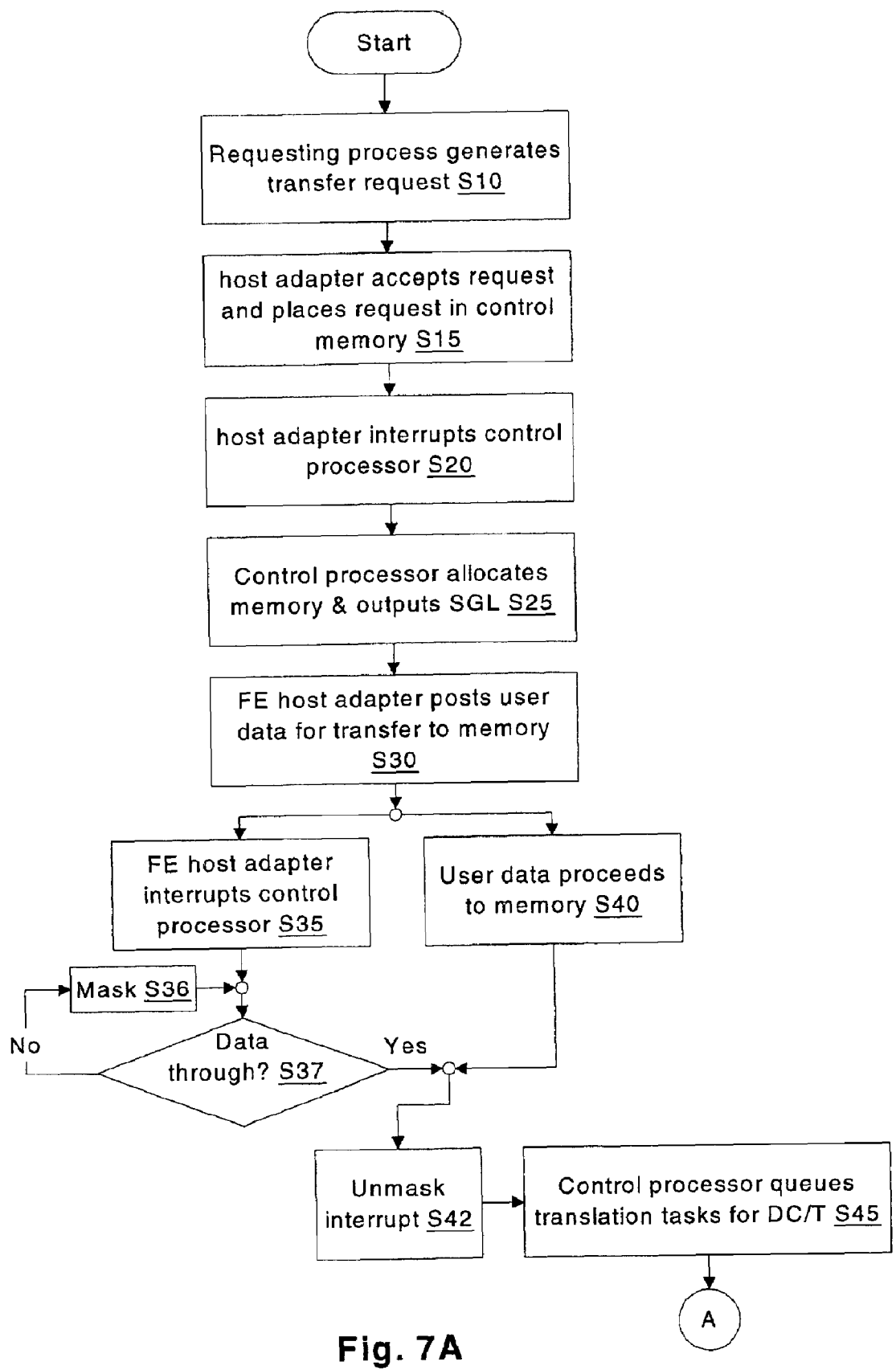
FIGS. 7A and 7B illustrate the processing of a write request according to embodiments of inventions disclosed.
Figure 7B:
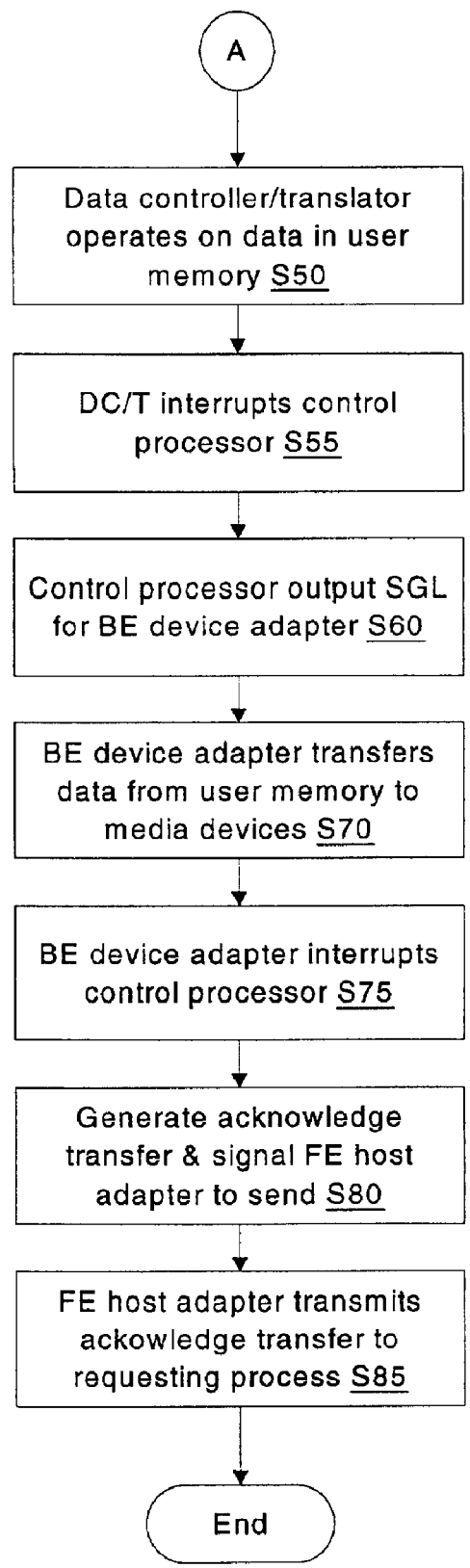
Figure 8A:
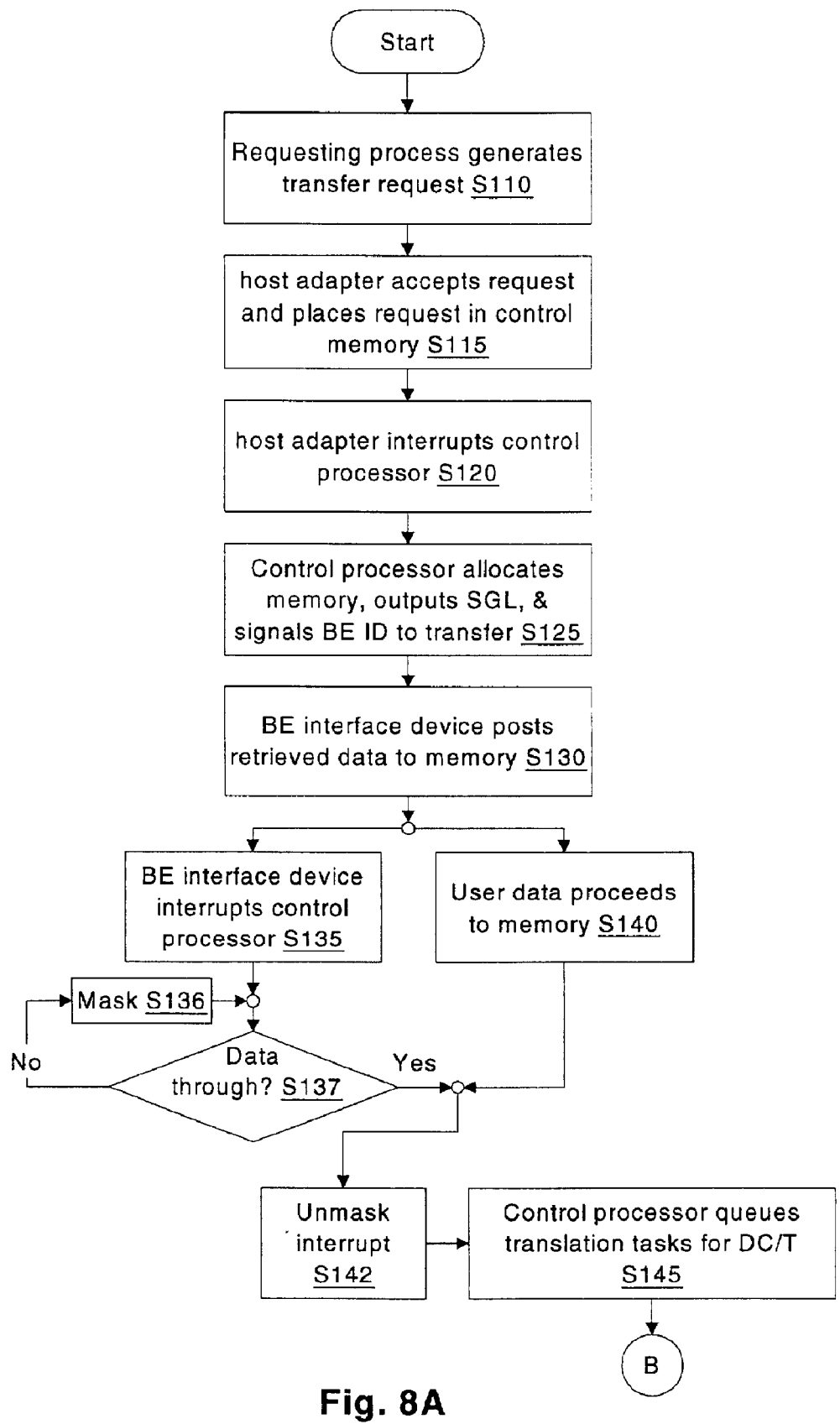
FIGS. 8A and 8B illustrate the processing of a read request according to embodiments of inventions disclosed.
Figure 8B:
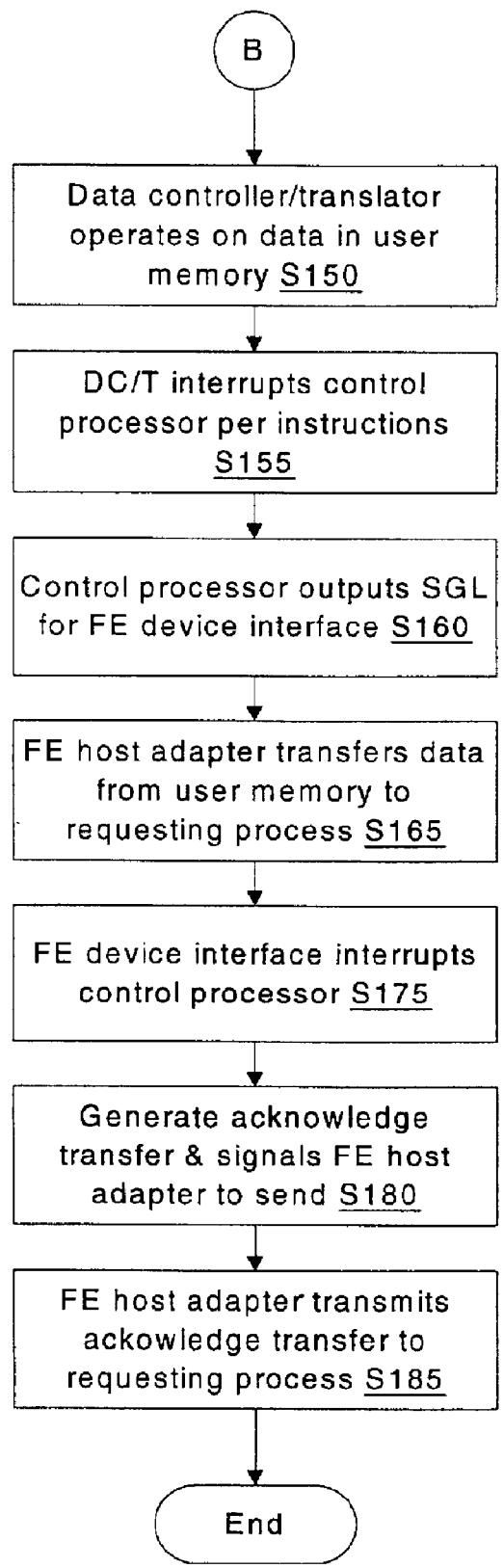

Returning to FIGS. 3, 4, 5, and 7A, the control processor 45 may queue translation tasks at step S45 in response to the interrupt unmasked at step S42. Referring now also to FIG. 7B, the data controller/translator 60 may then perform any required transformations on the user data in user data memory 130. For example, RAID 5 longitudinal parity may be calculated and added to the sectors in user memory 130. Alternatively, rather than storing data in memory and then performing translations on it and subsequently returning the translated data to memory, the data may be moved through a buffer, such as an XOR buffer, and the data translated as it is written to the user memory 130.

Figure 10:
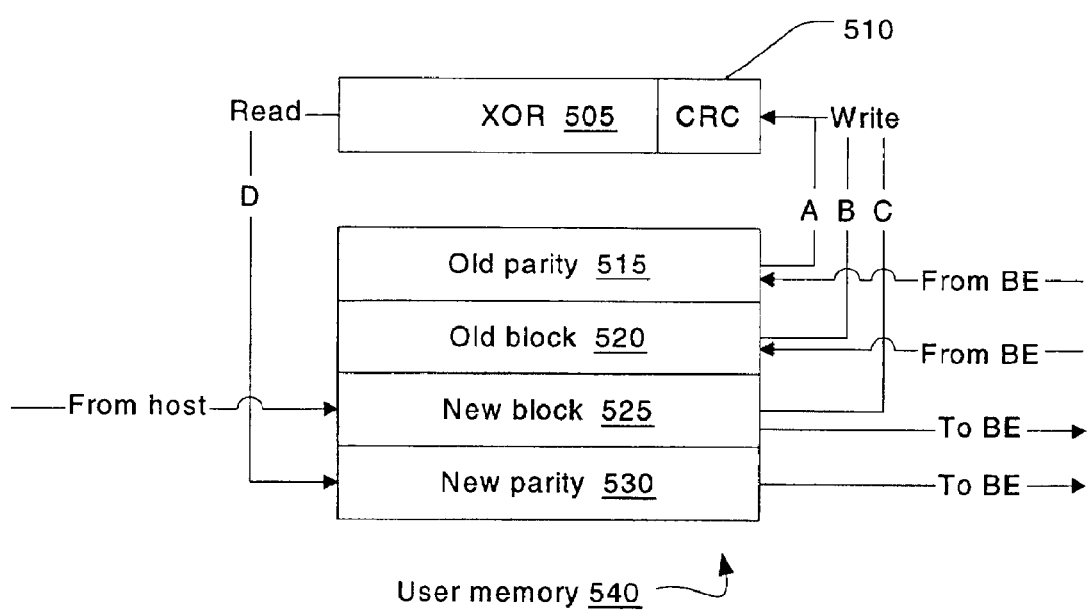
FIG. 10 illustrates a process of writing data to a BE store for discussion of I/O parallelism features of embodiments of inventions disclosed.

Preferably, data is operated on once it is in memory. Referring briefly to FIGS. 10 and 11, data blocks or words 320 being transferred to user memory 130 may be transferred through an XOR buffer 310 which retains the parity of all successive blocks or words transferred through it until reset. After the final data block of a sector 325 is transferred into memory, the contents of the XOR buffer 310 may be transferred to a memory location and provides the longitudinal parity block 300 for the sector 325. Then, when data is transferred out of user memory 130, each block may be transferred through XOR buffer 310 in such a way as to generate a parity sector 370 by transferring blocks 300/305 in order through the XOR buffer 310 (or the order may be taken into account when the data is used or transferred later). That is, a block 300 from a first sector 325 may be transferred first as indicated by arrow 351 through the XOR buffer 310 to a destination or back to the user memory 130 as indicated at 353. Then a block from a next sector (not shown but intermediate between sectors 325 and 327 as indicated by ellipses) may be transferred through the XOR buffer 310 to a destination or back to the user memory 130. When the last sector 327 is reached, a block from that sector 327 may be transferred through the XOR buffer 310 as indicated by arrow 352 to a destination or back to the user memory 130 as indicated at 354. After the transfer of a block from the final sector 327, a parity block for the parity sector 370 may be transferred from what remains in the XOR buffer 310 as indicated by arrow 359. The XOR buffer 310 may then be reset and the process repeated for the next block 305 beginning with the first sector 325 as indicated by arrows 355, 357, 356, 358. After the next blocks of the last sector 327 are transferred through the XOR buffer 310, the contents again may be taken as the next block of the parity sector 370 as indicated by arrow 360. The process is repeated for all the blocks of all the sectors until the entire parity sector 370 is completed.

Note that, rather than create the parity sectors piecemeal as indicated above, a sector-sized XOR buffer (not shown) may be used and the data transferred sector by sector, rather than block by block/sector by sector. Also note that other types of error detection and correction codes are applicable in this context such as cyclic redundancy check (CRC).

Returning again to FIGS. 3, 4, 5, and 7B, step S50 may include other operations on user data such as data compression, encryption, other types of error correcting or checking codes, translation, etc. Next, in step S55, the data controller/translator 60 may interrupt the control processor 45 to indicate that the data is ready to be moved to the media devices 17 (FIG. 1A) or other destination via the BE interface 140. A command to apply the interrupt may be provided in the instruction queue generated by the control processor 45 as discussed above. The control processor 45, in response to the interrupt, may output an SGL or other data to control memory 46 at step S60 to permit the BE device adapter 84 to retrieve the user data. In step S70, the BE device adapter 84 then transfers data from user memory 130 to media devices 17 or other devices according to the particular configuration. The BE device adapter then signals the control processor 45 that it has completed the data transfer by invoking an interrupt at step S75. The control processor 45, at step S80, may then generate an acknowledge-transfer signal, for example a message. The signal may be placed in control memory 46. In step S85, the FE host adapter 74 then fetches, from control memory 46, and transmits the acknowledge-transfer signal to the requesting process 10.

Referring now to FIGS. 3, 4, 5, and 8A, a second flowchart summarizes the process of transmitting information through the storage processor 15 from the media devices 17 or other devices outboard of the BE interface 48 to the requesting process 10. In a RAID system, this would be a process responsive to a read request. In step S110, the requesting process 10 generates a transfer request to read information from media devices 17. In step S115, the host adapter 74 accepts the request and places a request in control memory 46. In step S120, the host adapter generates an interrupt to indicate to the control processor 45 that a request is in control memory 46. Next, in step S125, the control processor 45 generates allocation data, for example, an SGL and outputs it to control memory 46. The control processor 45 also signals the BE device adapter 84 at step S125 to indicate that the data may be transferred to user memory 130. The BE device adapter 84 then posts the user data for which the request was generated to the storage processor 16 BE interface 47. As in the write request discussed with reference to FIGS. 7A and 7B, the latter is connected to the backplane communications device 50 (or the equivalent user data communications device 115), which provides a store and forward communications fabric that allows the user data to be offloaded quickly and may take some interval to be transmitted to its destination(s) in user memory 130.

In step S135, after completing the posting of user data, the BE device adapter 84 invokes a maskable interrupt to the control processor 45. Again, the BE device adapter may make no attempt to control the timing of the interrupt or any ordering issues and the interrupt may be masked until the data path is flushed. The flushing of the data path may be determined in step S137 in various ways as discussed above with respect to the write request operation.

The control processor 45 may queue translation tasks at step S145 in response to the interrupt unmasked at step S142. Referring now also to FIG. 7B, the data controller/translator 60 may then perform any required transformations on the user data in user data memory 130. Again the transformation may be handled in various ways as discussed with regard to the write request operation. For example, the data in the memory 130 may be used to regenerate bad sectors, as in RAID 5. Referring now to FIGS. 3, 4, 5, and 8B, step S150 may include other operations on user data such as data compression, encryption, other types of error correcting or checking codes, translation, etc. Next, in step S155, the data controller/translator 60 may interrupt the control processor 45 to indicate that the data is ready to be moved to the requesting process 10 (FIG. 1A). A command to apply the interrupt may be provided in the instruction queue generated by the control processor 45 as discussed above. The control processor 45, in response to the interrupt, may output an SGL or other data to control memory 46 which may be read by the FE host adapter 74 at step S160 to permit it to retrieve the user data. In step S165, the FE host adapter 74 then transfers data from user memory 130 to the requesting process 10. The FE host adapter 74 then signals the control processor 45 that it has completed the data transfer by invoking an interrupt at step S175. The control processor 45, at step S180, may then generate an acknowledge-transfer signal, for example a message. The signal may be placed in control memory 46. In step S185, the FE host adapter 74 then fetches, from control memory 46, and transmits the acknowledge-transfer signal to the requesting process 10.

Preferably, in the above embodiments, separate buffers are allocated for read and write transactions. This allows write posting of data to be done while a particular read transaction is being processed. Without this feature, the write transaction has to wait until the read transaction is processed before it may proceed. Note also that in the above embodiments, the control processor is not informed of changes to any temporary copies of data as would be required if caching were used in routing the data between FE, BE, and PE. Caching may be provided for user data stored in user memory 130, but this, in a preferred embodiment, is non touched by the processor at all; that is, the processor may not be informed of changes to data in the user memory 130. This keeps the control processor from being burdened by invalidates. Note that although the above embodiments contemplated the use of an ASIC for implementing the control processor 15/16, many of the features of these embodiments may be implemented using commodity devices. For example, the data controller/translator 60 may be instantiated as a microprocessor for performing the specialized functions required by the storage processor 15/16. That is, there would be two independent processors, one for control and one to handle the user data and translation operations.

Certain benefits are achieved by means of the above embodiments. These include:
1) User data may be placed in memory in a single step to generate parity data such that user data is transferred from disk to memory, parity added to user data in memory, and parity and user data transferred from memory to client process in no more than two steps with intervening steps for generating parity data.
2) The translation between protocols from disk to memory and back to the requesting process may provide compatibility with standard bus protocols.
3) Address translation is handled on the SP to unburden FE & BE. There is no need for either of them to handle scatter-gather data.
4) The memory controller and XOR engine are integrated in same device which:
    a) permits look-ahead requests and
    b) The XOR engine can be combined with the DMA.
5) User data need not be "snooped" on controller processor bus.
6) The code used by the DMA/XOR engine may be reprogrammed.
7) The DMA sends an interrupt to processor when its queue runs out, rather than pushing its status. The processor can then keep the DMA working rather than getting around to looking at its status.

FIG. 10 illustrates steps involved in handling a single write request in a RAID system in which longitudinal and non-longitudinal parity are generated to complete the handling of the request. The situation illustrated is where only one data block is overwritten. Four blocks of data are involved: an old parity block 515, which comes from the BE, particularly, one or more disks, depending on the details of the RAID implementation; an old block 520, i.e., a copy of the block to be written over; a new block 525, i.e., the new data block being written to the disks which comes from the host; and a new parity block 530 which is calculated from the foregoing data blocks 515, 520, and 525. To calculate the new parity block 530, old parity block 515 is read into the XOR FIFO 505 as indicated by arrow 515, then the old block 520 is read in as indicated by the arrow B to reverse its contribution to the old parity block 515. Then the new block 525 is read into the XOR FIFO 505 as indicated by the arrow C and the new parity block 530 read out and stored in user memory 540 as indicated by the arrow D. Note that the host may convey a portion of a new block and this could be written over corresponding portions of the old block 520 as would be understood by persons of skill in the art.

Figure 6C:
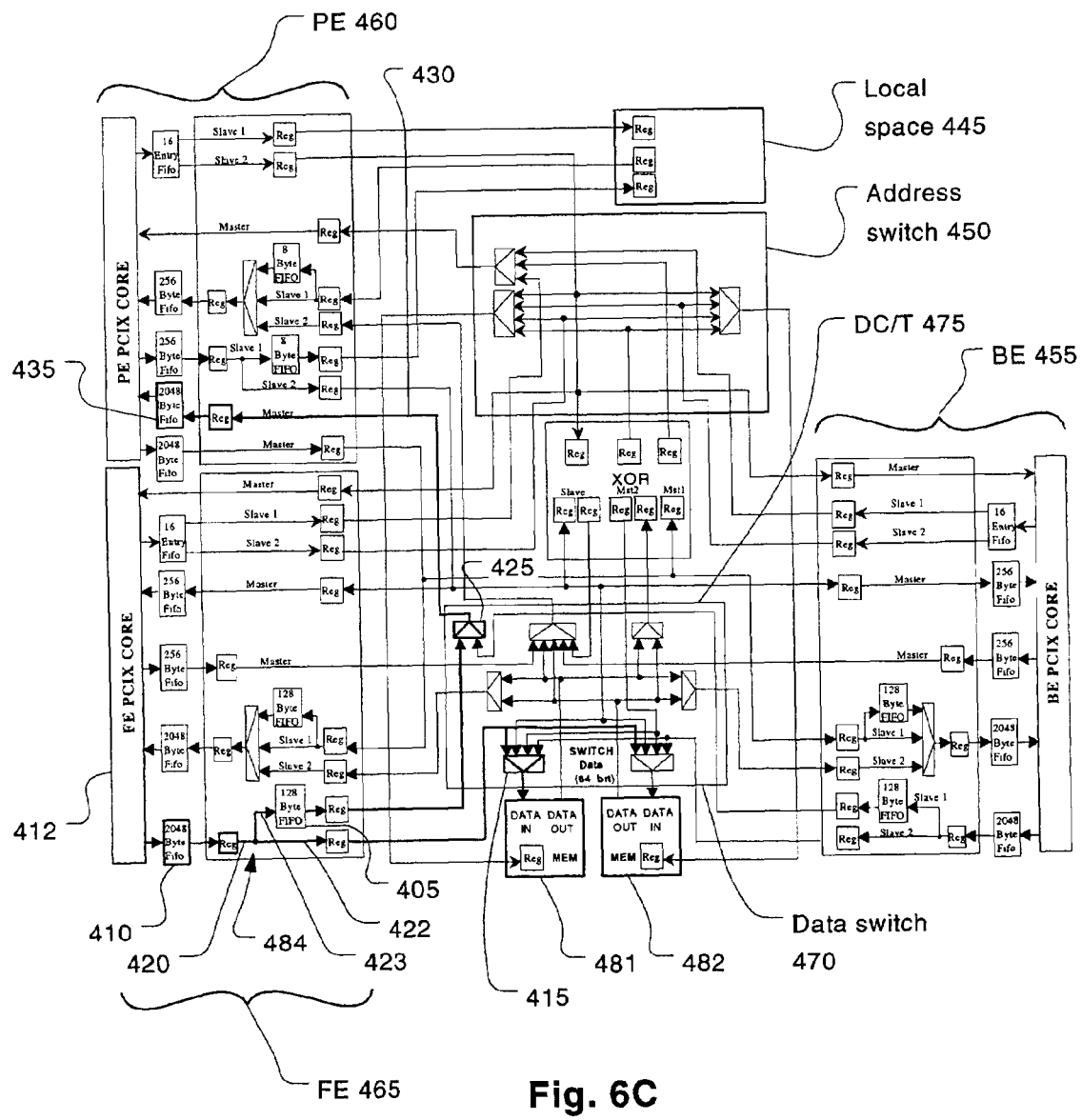
FIG. 6C is a detailed illustration of an embodiment of a storage processor for purposes of illustrating the data path features of FIG. 6B and other storage processor features according to embodiments of inventions disclosed.
Figure 11A:
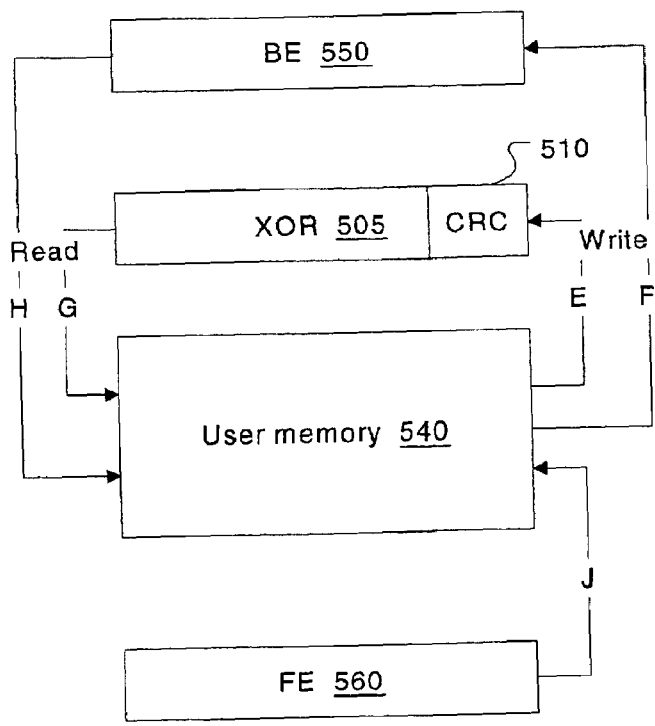
FIGS. 11A and 11B illustrate a multiple-threaded set of processes of writing data to a BE store for discussion of I/O parallelism features of embodiments of inventions disclosed.
Figure 11B:
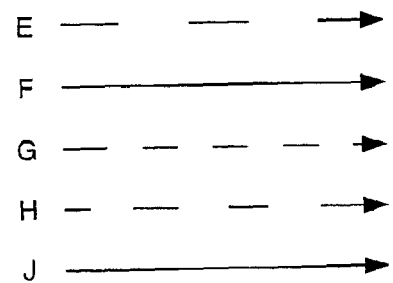

If the process of FIG. 10 were done over and over again in multiple threads (assuming level allocation of the independent memory channels 481 and 482—FIG. 6C), the situation of illustrated in FIGS. 11A and 11B would result. That is, data would stream from the back end 550 into memory 540 as indicated by arrow H; data would stream through the XOR FIFO 505, from and to user memory 540, as indicated by arrows E and G. Data would stream from the FE 560 as indicated by arrow J and results written to the BE 550 as indicated by arrow F. As illustrated in FIG. 11B, transfers corresponding to arrows E, F, G, H, and J may occur essentially simultaneously. Note that the use of the two memories 481 and 482 as shown in FIG. 6C is particularly significant for load-leveling in this context if the memory speed is such that a single memory channel (e.g., bus) is unable to handle the throughput potential of the FE and BE interfaces 47 and 48 (FIG. 3). (See discussion attending FIGS. 13A and 13B). Some of the lines (E, G, and H) in FIG. 11B are broken to illustrate that maintenance of continuous saturation of the bandwidth of the FE and BE interfaces 47 and 48, which are illustrated by lines F and J, may not require continuous transfer of data represented by these lines (E, G, and H). This assumes the size of the channels carrying the data transfers represented by each line E, F, G, H, and J is the same bandwidth and, of course, this need not be the case and is shown just for illustration of the basic concepts discussed.

Figures 12A, 12B:
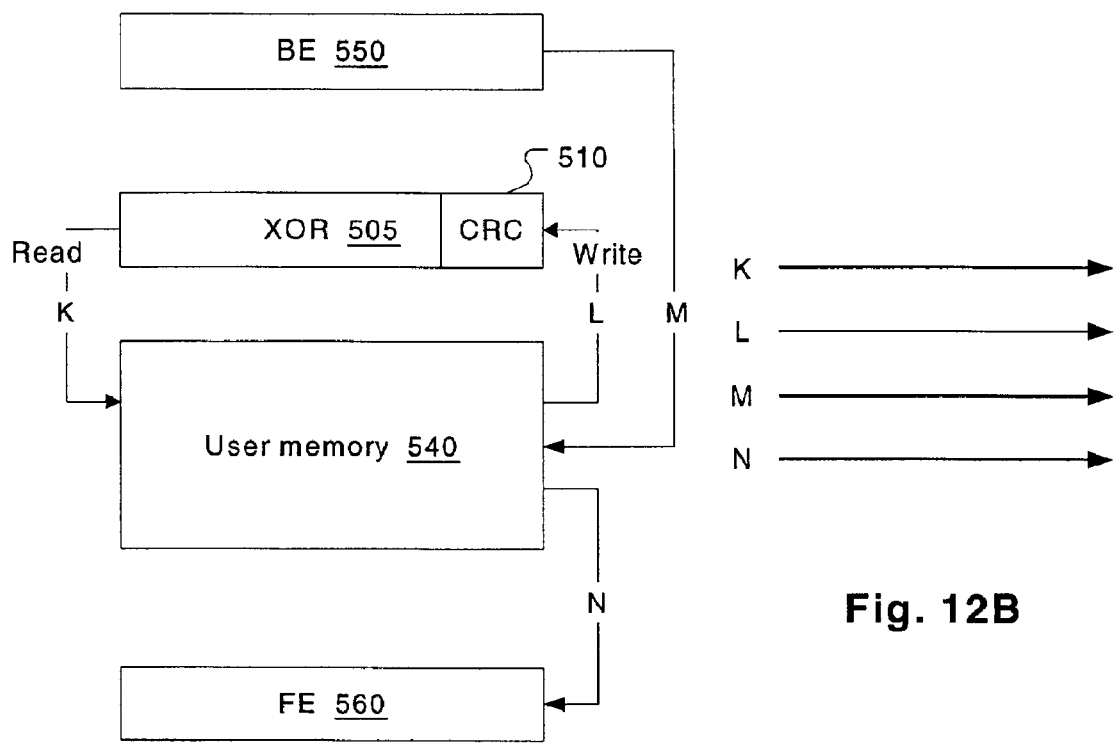
FIGS. 12A and 12B illustrate a multiple-threaded set of processes of reading data from a BE store for discussion of I/O parallelism features of embodiments of inventions disclosed.

Referring to FIGS. 12A and 12B, a read request with reconstruction of lost data from non-longitudinal parity (parity blocks) may be satisfied with full saturation of the FE and BE 47 and 48 channels 47A and 47B in a similar manner as discussed in connection with FIGS. 11A and 11B. In FIGS. 12A and 12B it is assumed multiple threads of just read requests are being satisfied. Data streams from the back end 550 into memory 540 as indicated by arrow M; data streams through the XOR FIFO 505, from and to user memory 540, as indicated by arrows L and K. Data streams to the FE 560 from the memory 540 as indicated by arrow N. As illustrated in FIG. 12B, transfers corresponding to arrows K, L, M, and N may occur essentially simultaneously. Again, since there are shown simultaneous reads from memory, it is assumed that there is level allocation of the independent memory channels 481 and 482 shown in FIG. 6C.

Figure 13A:
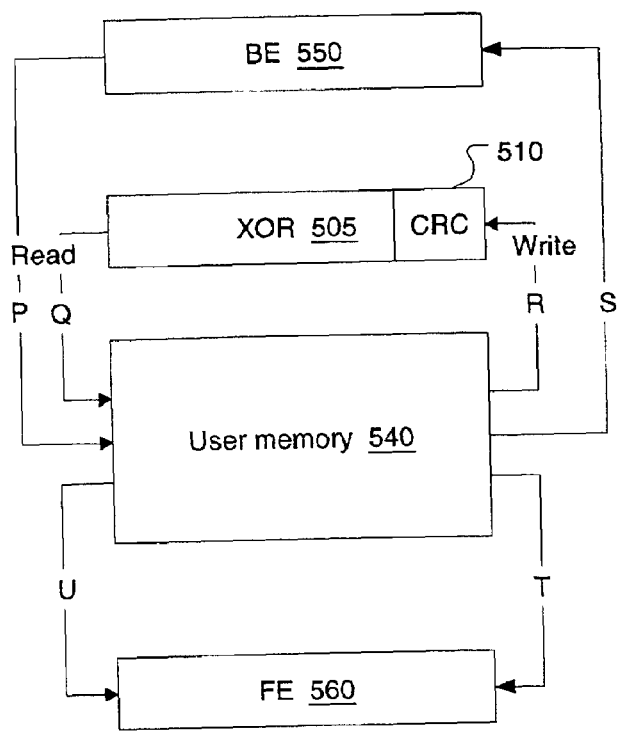
FIGS. 13A and 13B illustrate multiple threads of various processes for discussing I/O parallelism features of embodiments of inventions disclosed.
Figure 13B:
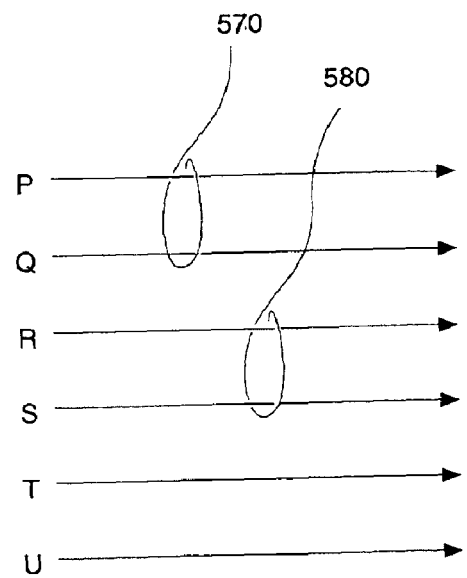

Referring to FIGS. 13A and 13B, with two memories (e.g., 481 and 482) with respective access channels, e.g., high speed memory buses, the user data channels from FE and BE may be saturated for all data transfers between FE and BE. To saturate the FE channel, the number of memory channels and their bandwidths must sufficient to provide the required number of simultaneous reads and writes. Referring to FIGS. 13A and 13B many read and write requests multi-threaded so that they occur nearly simultaneously permitting, approximately, full saturation of the FE and BE channels. Each transfer through the FE or BE may require multiple reads and writes from memory. Thus, the memory bandwidth multiplied by the number of memories and memory channels must be greater than three times the FE bandwidth to provide for the multiple memory accesses required. But with suitable load balancing, the bandwidth of each memory can be reduced below that required if a single memory and channel were used. The load balancing among the multiple memory writes, represented by the lines P and Q, and the multiple simultaneous memory reads, represented by lines R and S, is assumed. These pairs of data streams are indicated at 570 and 580. Although all the lines P–U in FIG. 13B are shown as unbroken, suggesting that all channels associated therewith are saturated, it is obvious that this is an idealization since not all operations would stream through the XOR FIFO 505.

Note that the preceding discussion of FIGS. 10–13B is somewhat idealized since in the embodiments discussed above, there may be some attenuation of throughput caused by sharing of channels such as discussed in connection with FIG. 6C.

Although the foregoing invention has, for the purposes of clarity and understanding, been described in some detail by way of illustration and example, it will be obvious that certain changes and modifications may be practiced that will still fall within the scope of the appended claims. For example, the devices and methods of each embodiment can be combined with or used in any of the other embodiments.

What is claimed is:

1. A storage processor for a RAID system, comprising:

a communications device having a user data channel coupling a requesting device and a disk array, said user data channel having at least a first portion thereof that is used for transferring control data;

a buffer connected to said first portion and controlled to accept said control data irrespective of a ready state of a downstream receiver of said control data such that a shared portion of the user data channel remains accessible for transferring user data;

a processor end interface which is configured to interface with a control processor as the downstream receiver; and user memory;

wherein the buffer resides in a front end interface which is configured to interface with a host computer as the requesting device, and wherein the buffer resides in a data switch which connects to (i) the processor end interface, (ii) the front end interface, and (iii) the user memory, the data switch being configured to control user data flow into the user memory along the shared portion and a user data portion of the user data channel without waiting for the control data to be accepted by the downstream receiver through the processor end interface; and wherein the first portion of the user data channel forms a control data branch configured to convey the control data from the shared portion of the user data channel to the processor end interface, and wherein the second portion of the user data channel forms a user data branch configured to convey the user data flow from the shared portion of the user data channel to the user memory.

2. A storage processor as in claim 1, wherein said communications device includes a switch.

3. A storage processor as in claim 2, wherein said buffer and said shared portion are external to said switch.

4. A storage processor as in claim 3, wherein said communications device is configured such that said buffer is connected to a first port of said switch and said shared portion is coupled through a user data channel carrying exclusively user data to a second port of said switch.

5. A storage processor as in claim 1, wherein said control processor is configured to perform data storage operations on the disk array on behalf of the requesting device.

6. A storage processor as in claim 1, further comprising:

a back end interface which is configured to interface with the disk array;

wherein the data switch is further configured to convey the user data flow from the user memory to the disk array through the back end interface.

* * * * *